US009241090B2

(12) United States Patent
Mita

(10) Patent No.: US 9,241,090 B2
(45) Date of Patent: Jan. 19, 2016

(54) IMAGE PROCESSING DEVICE, IMAGE CORRECTING METHOD AND PROGRAM

(71) Applicant: Konica Minolta Inc., Chiyoda-ku (JP)

(72) Inventor: Mieko Mita, Hino (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 14/578,850

(22) Filed: Dec. 22, 2014

(65) Prior Publication Data

US 2015/0181076 A1 Jun. 25, 2015

(30) Foreign Application Priority Data

Dec. 25, 2013 (JP) .................................. 2013-266383

(51) Int. Cl.
*H04N 1/401* (2006.01)
*H04N 1/409* (2006.01)
*H04N 1/60* (2006.01)
*H04N 1/393* (2006.01)
*H04N 1/00* (2006.01)
*G06K 15/02* (2006.01)

(52) U.S. Cl.
CPC ............ *H04N 1/401* (2013.01); *G06K 15/1822* (2013.01); *G06K 15/1872* (2013.01); *G06K 15/1882* (2013.01); *H04N 1/00482* (2013.01); *H04N 1/393* (2013.01); *H04N 1/4092* (2013.01); *H04N 1/60* (2013.01)

(58) Field of Classification Search
USPC .......................................................... 358/1.2
See application file for complete search history.

(56) References Cited

U.S. PATENT DOCUMENTS

| 2009/0033766 A1* | 2/2009 | Ito ............................. G06T 1/60 348/231.2 |
| 2012/0020569 A1* | 1/2012 | Mita ........................ G06K 9/38 382/199 |
| 2012/0147403 A1* | 6/2012 | Nakamura ......... G06K 15/1219 358/1.13 |

FOREIGN PATENT DOCUMENTS

| JP | 04-365182 A | 12/1992 |
| JP | 05-135165 | 6/1993 |
| JP | 2001-005245 A | 1/2001 |
| JP | 2002-135569 A | 5/2002 |
| JP | 2007-235609 A | 9/2007 |
| JP | 2013-065934 | 4/2013 |

OTHER PUBLICATIONS

Notice of Reasons for Rejection issued in corresponding Japanese Patent Application No. 2013-266383, dated Oct. 27, 2015, with English translation. (14 pages).

\* cited by examiner

*Primary Examiner* — Ngon Nguyen

(74) *Attorney, Agent, or Firm* — Buchanan Ingersoll & Rooney PC

(57) ABSTRACT

An image processing device includes: an image correcting unit configured to correct a size of an image by inserting or deleting a predetermined number of pixels into and from the image based on size changing information of the image in which a plurality of pixel data is arranged, wherein the image correcting unit includes: a reading unit configured to read at least any one of attribute data and the pixel data; a characteristic determining unit configured to determine a characteristic of the pixel of interest in the image; a deforming process selecting unit configured to select a type of a deforming process related to determination of a position and determination of a pixel value of a pixel; and a correction executing unit configured to execute the deforming process selected by the deforming process selecting unit.

21 Claims, 13 Drawing Sheets

FIG. 6A  FIG. 6B  FIG. 6C  FIG. 6D
 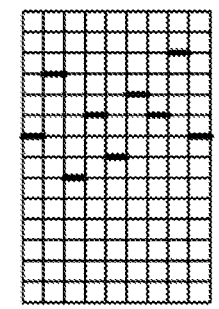  
FIG. 6E  FIG. 6F  FIG. 6G  FIG. 6H
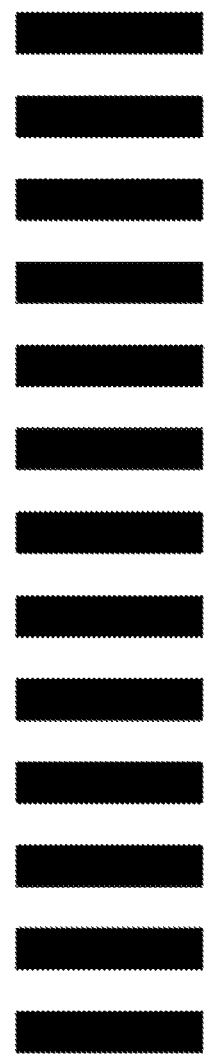 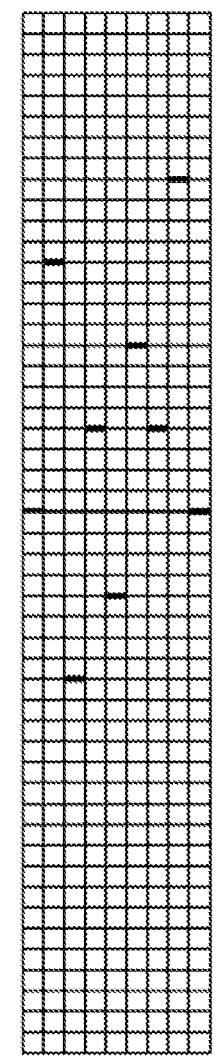 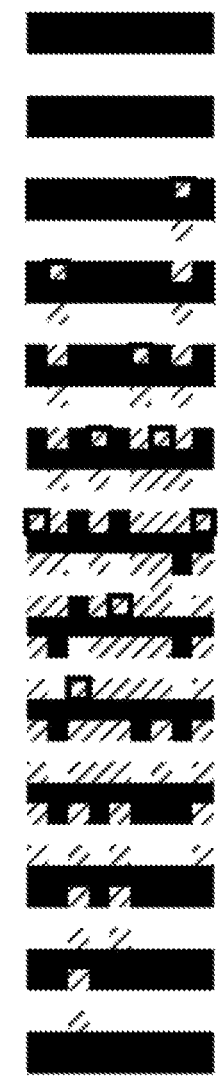 

*FIG. 10A*

| 0,0 | 0,1 | 0,2 | | 0,N-3 | 0,N-2 | 0,N-1 |
|---|---|---|---|---|---|---|
| 1,0 | 1,1 | 1,2 | | 1,N-3 | 1,N-2 | 1,N-1 |
| 2,0 | 2,1 | 2,2 | | 2,N-3 | 2,N-2 | 2,N-1 |
| 3,0 | 3,1 | 3,2 | | 3,N-3 | 3,N-2 | 3,N-1 |
| 4,0 | 4,1 | 4,2 | | 4,N-3 | 4,N-2 | 4,N-1 |
| 5,0 | 5,1 | 5,2 | | 5,N-3 | 5,N-2 | 5,N-1 |
| 6,0 | 6,1 | 6,2 | | 6,N-3 | 6,N-2 | 6,N-1 |
| 7,0 | 7,1 | 7,2 | | 7,N-3 | 7,N-2 | 7,N-1 |
| ≈ | | | | | | ≈ |
| M-2,0 | M-2,1 | M-2,2 | | M-2,N-3 | M-2,N-2 | M-1,N-1 |
| M-1,0 | M-1,1 | M-1,2 | | M-1,N-3 | M-1,N-2 | M-1,N-1 |

*FIG. 10B*

| 0 | 0 | 0 | | 0 | 0 | 0 |
|---|---|---|---|---|---|---|
| 0 | 0 | 0 | | 0 | 0 | 0 |
| 0 | 0 | 0 | | 0 | 0 | 1 |
| 0 | 1 | 0 | | 0 | 0 | 1 |
| 0 | 1 | 0 | | 1 | 0 | 1 |
| 0 | 1 | 0 | | 1 | 1 | 1 |
| 1 | 1 | 0 | | 1 | 1 | 1 |
| 1 | 1 | 1 | | 1 | 1 | 1 |
| ≈ | | | | | | ≈ |
| 1 | 1 | 1 | | 1 | 1 | 1 |
| 1 | 1 | 1 | | 1 | 1 | 1 |

FIG. 11A

| 0,0 | 0,1 | 0,2 | | 0,N-3 | 0,N-2 | 0,N-1 |
|---|---|---|---|---|---|---|
| 1,0 | 1,1 | 1,2 | | 1,N-3 | 1,N-2 | 1,N-1 |
| 2,0 | 2,1 | 2,2 | | 2,N-3 | 2,N-2 | 3,N-1 |
| 3,0 | 4,1 | 3,2 | | 3,N-3 | 3,N-2 | 4,N-1 |
| 4,0 | 5,1 | 4,2 | | 5,N-3 | 4,N-2 | 5,N-1 |
| 5,0 | 6,1 | 5,2 | | 6,N-3 | 6,N-2 | 6,N-1 |
| 7,0 | 7,1 | 6,2 | | 7,N-3 | 7,N-2 | 7,N-1 |
| 8,0 | 8,1 | 8,2 | | 8,N-3 | 8,N-2 | 8,N-1 |
| M-1,0 | M-1,1 | M-1,2 | | M-1,N-3 | M-1,N-2 | M-1,N-1 |
| 0,0 | 0,1 | 0,2 | | 0,N-3 | 0,N-2 | 0,N-1 |

FIG. 11B

| 1,0 | 1,1 | 1,2 | | 1,N-3 | 1,N-2 | 1,N-1 |
|---|---|---|---|---|---|---|
| 2,0 | 2,1 | 2,2 | | 2,N-3 | 2,N-2 | 2,N-1 |
| 3,0 | 3,1 | 3,2 | | 3,N-3 | 3,N-2 | 4,N-1 |
| 4,0 | 5,1 | 4,2 | | 4,N-3 | 4,N-2 | 5,N-1 |
| 5,0 | 6,1 | 5,2 | | 6,N-3 | 5,N-2 | 6,N-1 |
| 6,0 | 7,1 | 6,2 | | 7,N-3 | 7,N-2 | 7,N-1 |
| 8,0 | 8,1 | 7,2 | | 8,N-3 | 8,N-2 | 8,N-1 |
| 9,0 | 9,1 | 9,2 | | 9,N-3 | 9,N-2 | 9,N-1 |
| 0,0 | 0,1 | 0,2 | | 0,N-3 | 0,N-2 | 0,N-1 |
| 1,0 | 1,1 | 1,2 | | 1,N-3 | 1,N-2 | 1,N-1 |

IMAGE PROCESSING DEVICE, IMAGE CORRECTING METHOD AND PROGRAM

The entire disclosure of Japanese Patent Application No. 2013-266383 filed on Dec. 25, 2013 including description, claims, drawings, and abstract are incorporated herein by reference in its entirety.

BACKGROUND OF THE INVENTION

1. Field of the Invention

The present invention relates to an image processing device, an image correcting method, and a program.

2. Description of the Related Art

In the image forming device which forms an image on a recording medium by using toner, there is deviation between image positions of front and rear surfaces and between positions of images of a plurality of colors formed so as to be overlapped in association with uneven conveyance of the recording medium, contraction of the recording medium at the time of a fixing process and the like. There is a problem that image quality might be deteriorated by such positional deviation.

Therefore, there conventionally is technology to adjust positions by correcting an output image by software to overcome such a problem. For example, JP 3539283 B1 and JP 4882426 B1 disclose technology to additionally insert a new pixel or delete a pixel determined based on data of a peripheral pixel at an appropriate interval when adjusting the position by scaling up or down a plurality of overlapped images.

JP 4312944 B1 discloses technology related to setting of an edge and luminance for avoiding deterioration of the image when changing a resolution of a digital image. JP 4-365182 A discloses technology to use a method of determining a pixel value of an inserted pixel appropriate to each area by further classifying the image to be scaled up or down into a character area or a picture area for each block of a predetermined size.

However, portions having various characteristics are combined as line elements of a character and a frame line. An effect of the scaling of the image on the line elements differs according to a direction of the scaling. Therefore, there is a problem that the deterioration in the line element in an output image cannot be inhibited even when positional deviation correction to determine a position in which a pixel is inserted or deleted or to change the pixel value is performed by a uniform method on the character and the frame line.

SUMMARY OF THE INVENTION

An object of the present invention is to provide an image processing device, an image correcting method, and a program capable of outputting image data obtained by correcting positional deviation while inhibiting deterioration in line element.

To achieve the abovementioned object, according to an aspect, an image processing device reflecting one aspect of the present invention comprises: an image correcting unit configured to correct a size of an image by inserting or deleting a predetermined number of pixels into and from the image based on size changing information of the image in which a plurality of pixel data is arranged, wherein the image correcting unit includes: a reading unit configured to read at least any one of attribute data corresponding to pixel of interest data in the image and the pixel data in a predetermined peripheral range including the pixel of interest; a characteristic determining unit configured to determine a characteristic of the pixel of interest in the image from the data read by the reading unit; a deforming process selecting unit configured to select a type of a deforming process related to determination of a position in which the predetermined number of pixels are inserted or deleted and determination of a pixel value of a pixel in a predetermined range from the inserted or deleted pixel based on a determination result of the characteristic determining unit from a plurality of types set in advance; and a correction executing unit configured to execute the deforming process selected by the deforming process selecting unit.

According to the invention of Item. 2, in the image processing device according to Item. 1, the attribute data preferably includes at least one of area information to classify a plurality of areas including an image area, a graph area, and a character area in the image and information related to an edge portion of a graph and a character, and the characteristic determining unit preferably determines a direction in which a line extends and a line width or a fine portion having a fine structure in the graph area and the character area based on continuity of the information related to the edge portion in the pixels in a predetermined adjacent range including the pixel of interest.

According to the invention of Item. 3, in the image processing device according to Item. 1, the characteristic determining unit preferably performs area determination to classify into any one of a plurality of areas including an image area, a graph area, and a character area and determines a direction in which a line extends and a line width or a fine portion having a fine structure in the determined graph area and character area based on presence of continuity of pixel values of the pixels in a predetermined adjacent range including the pixel of interest of the image and an arranging direction and a width of the pixels having the continuity by using data of the image on which a screen process is not yet performed when the read data is the pixel data.

According to the invention of Item. 4, in the image processing device according to any one of Items. 1 to 3, the deforming process selecting unit preferably selects any one of: a neighborhood pixel moving process to copy the pixel value of any one of adjacent pixels to insert or to delete the pixel data in each position on a predetermined line perpendicular to a deforming direction; a neighborhood pixel averaging process to insert a predetermined weighted average value of pixel values of a plurality of adjacent pixels in each position on the predetermined line perpendicular to the deforming direction or to delete the pixel being a deletion target in the predetermined position and change the pixel values of a plurality of pixels adjacent to the pixel being the deletion target to predetermined weighted average values including the pixel being the deletion target; a dispersed neighborhood pixel moving process to copy any one of the adjacent pixel values to insert or to delete the pixel data in each of positions different for each pixel column in which a plurality of pixels is arranged in the deforming direction; and a dispersed neighborhood pixel averaging process to insert the predetermined weighted average value of the pixel values of the adjacent pixels in each of the positions different for each pixel column in which a plurality of pixels is arranged in the deforming direction to distribute an effect of the insertion to predetermined peripheral pixels of the inserted pixel or to delete the pixel data and distribute an effect of the deletion to predetermined peripheral pixels of the deleted pixel.

According to the invention of Item. 5, in the image processing device according to Item. 4, the image processing device preferably comprises: a dispersed position table outputting unit capable of outputting a dispersed position determining table determining an insertion position or a deletion position of the pixel data in each of the pixel columns in which a plurality of pixels is arranged in the deforming direction based on a plurality of different methods when the deforming process selecting unit selects the dispersed neighborhood pixel moving process or the dispersed neighborhood pixel averaging process, and the deforming process selecting unit preferably selects one dispersed position determining table to be output from the dispersed position table outputting unit according to the characteristic determined by the characteristic determining unit when selecting the dispersed neighborhood pixel moving process or the dispersed neighborhood pixel averaging process.

According to the invention of Item. 6, in the image processing device according to any one of Items. 1 to 5, the image processing device preferably comprises: an operation unit configured to receive an operation by a user, and the deforming process selecting unit preferably selects the deforming process related to a selection instruction when an input related to the selection instruction of the deforming process is performed to the operation unit.

According to the invention of Item. 7, in the image processing device according to any one of Items. 1 to 6, the correction executing unit preferably separately performs deforming processes in two directions orthogonal to each other in order, and the deforming process selecting unit preferably selects the deforming process related to deformation in one direction and selects the deforming process related to the deformation in the other direction based on a common characteristic initially determined by the characteristic determining unit.

According to the invention of Item. 8, in the image processing device according to any one of Items. 1 to 7, the image processing device preferably comprises: a screen process executing unit configured to perform a screen process by using a predetermined threshold matrix on the data of the image, the correction executing unit preferably includes a correction content setting unit configured to set a process content of the deforming process based on the size changing information, the determined characteristic of each pixel, and the selected type of the deforming process, and a correction content executing unit configured to execute the process content set by the correction content setting unit on the data of the image, the screen process executing unit preferably generates an inverse process matrix obtained by performing a process opposite to the deforming process of each pixel set by the correction content setting unit on each element of the threshold matrix and executes the screen process by using the inverse process matrix on the data of the image, and the correction content executing unit preferably performs the deforming process on the data of the image on which the screen process by the screen process executing unit is already performed.

According to the invention of Item. 9, in the image processing device according to any one of Items. 1 to 7, the image processing device preferably comprises: a character edge correcting unit configured to perform predetermined correction on the pixel value in the vicinity of an edge portion of a character based on information related to the edge portion of the character, and the image correcting unit preferably performs the deforming process on the data of the image which is already corrected by the character edge correcting unit.

According to the invention of Item. 10, in the image processing device according to any one of Items. 1 to 7, the image processing device preferably comprises: a character edge correcting unit configured to perform predetermined correction on the pixel value in the vicinity of an edge portion of a character based on information related to the edge portion of the character, the image correcting unit preferably performs the deforming process on the data of the image before the correction by the character edge correcting unit is performed, and the character edge correcting unit preferably uses information related to deformation of the edge portion of the character by the deforming process in the correction.

To achieve the abovementioned object, according to an aspect, a non-transitory recording medium storing a computer readable program reflecting one aspect of the present invention causes a computer to serve as an image correcting unit configured to correct a size of an image by inserting or deleting a predetermined number of pixels into and from the image based on size changing information of the image in which a plurality of pixel data is arranged, and the image correcting unit comprises: a reading unit configured to read at least any one of attribute data corresponding to pixel of interest data in the image and the pixel data in a predetermined peripheral range including the pixel of interest; a characteristic determining unit configured to determine a characteristic of the pixel of interest in the image from the data read by the reading unit; a deforming process selecting unit configured to select a type of a deforming process related to determination of a position in which the predetermined number of pixels are inserted or deleted and determination of a pixel value of a pixel in a predetermined range from the inserted or deleted pixel based on a determination result of the characteristic determining unit from a plurality of types set in advance; and a correction executing unit configured to execute the deforming process selected by the deforming process selecting unit.

According to the invention of Item. 12, in the non-transitory recording medium storing a computer readable program according to Item. 11, the attribute data preferably includes at least one of area information to classify a plurality of areas including an image area, a graph area, and a character area in the image and information related to an edge portion of a graph and a character, and the characteristic determining unit preferably determines a direction in which a line extends and a line width or a fine portion having a fine structure in the graph area and the character area based on continuity of the information related to the edge portion in the pixels in a predetermined adjacent range including the pixel of interest.

According to the invention of Item. 13, in the non-transitory recording medium storing a computer readable program according to Item. 11, the characteristic determining unit preferably performs area determination to classify into any one of a plurality of areas including an image area, a graph area, and a character area and determines a direction in which a line extends and a line width or a fine portion having a fine structure in the determined graph area and character area based on presence of continuity of pixel values of the pixels in a predetermined adjacent range including the pixel of interest of the image and an arranging direction and a width of the pixels having the continuity by using data of the image on which a screen process is not yet performed when the read data is the pixel data.

According to the invention of Item. 14, in the non-transitory recording medium storing a computer readable program according to any one of Items. 11 to 13, the deforming process selecting unit preferably selects any one of: a neighborhood pixel moving process to copy the pixel value of any one of adjacent pixels to insert or to delete the pixel data in each position on a predetermined line perpendicular to a deforming direction; a neighborhood pixel averaging process to insert a predetermined weighted average value of pixel values of a plurality of adjacent pixels in each position on the predetermined line perpendicular to the deforming direction or to delete the pixel being a deletion target in the predetermined position and change the pixel values of a plurality of pixels adjacent to the pixel being the deletion target to predetermined weighted average values including the pixel being the deletion target; a dispersed neighborhood pixel moving process to copy any one of the adjacent pixel values to insert or to delete the pixel data in each of positions different for each pixel column in which a plurality of pixels is arranged in the deforming direction; and a dispersed neighborhood pixel averaging process to insert the predetermined weighted average value of the pixel values of the adjacent pixels in each of the positions different for each pixel column in which a plurality of pixels is arranged in the deforming direction to distribute an effect of the insertion to predetermined peripheral pixels of the inserted pixel or to delete the pixel data and distribute an effect of the deletion to predetermined peripheral pixels of the deleted pixel.

According to the invention of Item. 15, in the non-transitory recording medium storing a computer readable program according to Item. 14, the non-transitory recording medium storing a computer readable program preferably comprises: a dispersed position table outputting unit capable of outputting a dispersed position determining table determining an insertion position or a deletion position of the pixel data in each of the pixel columns in which a plurality of pixels is arranged in the deforming direction based on a plurality of different methods when the deforming process selecting unit selects the dispersed neighborhood pixel moving process or the dispersed neighborhood pixel averaging process, the deforming process selecting unit preferably selects one dispersed position determining table to be output from the dispersed position table outputting unit according to the characteristic determined by the characteristic determining unit when selecting the dispersed neighborhood pixel moving process or the dispersed neighborhood pixel averaging process.

According to the invention of Item. 16, in the non-transitory recording medium storing a computer readable program according to any one of Items. 11 to 15, the computer is preferably capable of receiving an operation by a user through an operation unit, and the deforming process selecting unit preferably selects the deforming process related to a selection instruction when an input related to the selection instruction of the deforming process is performed to the operation unit.

According to the invention of Item. 17, in the non-transitory recording medium storing a computer readable program according to any one of Items. 11 to 16, the correction executing unit preferably separately performs deforming processes in two directions orthogonal to each other in order, and the deforming process selecting unit preferably selects the deforming process related to deformation in one direction and selects the deforming process related to the deformation in the other direction based on a common characteristic initially determined by the characteristic determining unit.

According to the invention of Item. 18, in the non-transitory recording medium storing a computer readable program according to any one of Items. 11 to 17, the non-transitory recording medium storing a computer readable program preferably causes the computer to further serve as a screen process executing unit configured to perform a screen process by using a predetermined threshold matrix on the data of the image, the correction executing unit preferably includes a correction content setting unit configured to set a process content of the deforming process based on the size changing information, the determined characteristic of each pixel, and the selected type of the deforming process, and a correction content executing unit configured to execute the process content set by the correction content setting unit on the data of the image, the screen process executing unit preferably generates an inverse process matrix obtained by performing a process opposite to the deforming process of each pixel set by the correction content setting unit on each element of the threshold matrix and executes the screen process by using the inverse process matrix on the data of the image, and the correction content executing unit preferably performs the deforming process on the data of the image on which the screen process by the screen process executing unit is already performed.

According to the invention of Item. 19, in the non-transitory recording medium storing a computer readable program according to any one of Items. 11 to 17, the non-transitory recording medium storing a computer readable program preferably causes the computer to further serve as a character edge correcting unit configured to perform predetermined correction on the pixel value in the vicinity of an edge portion of a character based on information related to the edge portion of the character, and the image correcting unit preferably performs the deforming process on the data of the image which is already corrected by the character edge correcting unit.

According to the invention of Item. 20, in the non-transitory recording medium storing a computer readable program according to any one of Items. 11 to 17, the non-transitory recording medium storing a computer readable program preferably causes a computer to further serve as a character edge correcting unit configured to perform predetermined correction on the pixel value in the vicinity of an edge portion of a character based on information related to the edge portion of the character, the image correcting unit preferably performs the deforming process on the data of the image before the correction by the character edge correcting unit is performed, and the character edge correcting unit preferably uses information related to deformation of the edge portion of the character by the deforming process in the correction.

To achieve the abovementioned object, according to an aspect, an image correcting method, reflecting one aspect of the present invention, configured to correct a size of an image by inserting or deleting a predetermined number of pixels into and from the image based on size changing information of the image in which a plurality of pixel data is arranged comprises: a reading step of reading at least any one of attribute data corresponding to pixel of interest data in the image and pixel data in a predetermined peripheral range including the pixel of interest; a character determining step of determining a characteristic of the pixel of interest in the image from the data read by the step of reading; a deforming process selecting step of selecting a type of a deforming process related to determination of a position in which the predetermined number of pixels are inserted or deleted and determination of a pixel value of a pixel in a predetermined range from the inserted or deleted pixel based on a determination result in the step of determining a characteristic from a plurality of types set in advance; and a correction executing step of executing the deforming process selected at the deforming process selecting step.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIGS. 6A to 6H are views illustrating an example of the image on which the deforming process is performed by the setting method which may be selected and used by the image processing device;

FIGS. 10A and 10B are views illustrating a row number and a column number indicating each component of an original dither matrix and an example of a shift amount in each pixel position; and FIGS. 11A and 11B are views illustrating each component of a dither matrix for first screen and a dither matrix for second screen calculated by a dither matrix inverse converting unit.

DESCRIPTION OF THE PREFERRED EMBODIMENTS

Hereinafter, an embodiment of the present invention will be described with reference to the drawings. However, the scope of the invention is not limited to the illustrated examples.

Figure 1:
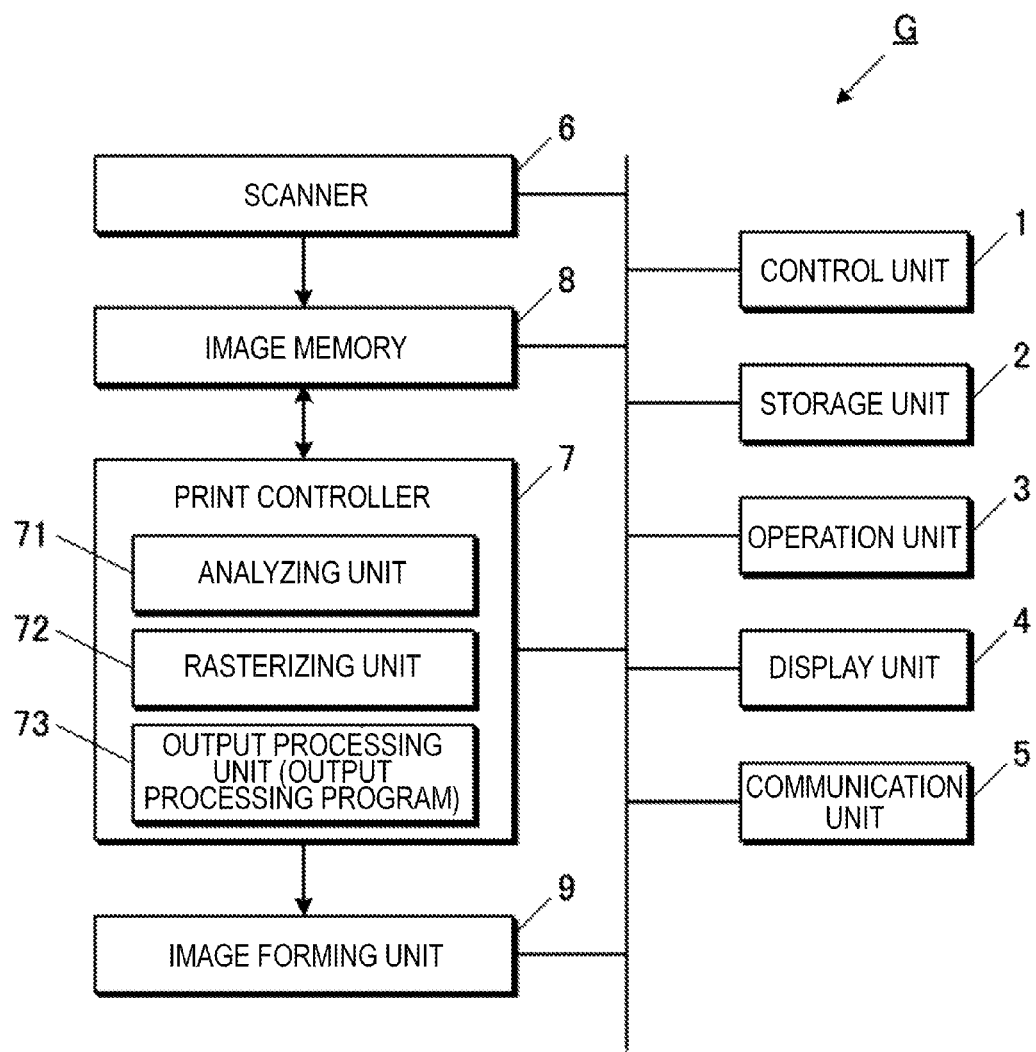
FIG. 1 is a block diagram illustrating a configuration of an image forming device including an image processing device of an embodiment of the present invention.

FIG. 1 is a block diagram illustrating a configuration of an image forming device G including an embodiment of an image processing device of the present invention. The image forming device G is provided with a control unit 1, a storage unit 2, an operation unit 3 (operating means), a display unit 4, a communication unit 5, a scanner 6, a print controller 7, an image memory 8, an image forming unit 9 and the like.

The control unit 1 provides centralized control of operations of units of the image forming device G. The control unit 1 provided with a CPU (central processing unit) and a RAM (random access memory) reads various control programs stored in the storage unit 2 to execute and performs various types of arithmetic processing related to a control operation. For example, the control unit 1 allows the print controller 7 to perform image processing of image data input to be stored in the image memory 8 and allows the image forming unit 9 to form an image on a recording medium by using the processed image data.

The storage unit 2 stores the program which the control unit 1 may read, data, setting and the like. One or a plurality of readable/writable storage media such as a HDD (hard disk drive), an SSD (solid state drive), and a flash memory, for example, may be used as the storage unit 2. The storage unit 2 may also be provided with a ROM (read only memory).

The operation unit 3 provided with a touch sensor integrally formed with the display unit 4, an operation key and the like outputs an operation signal according to a touch operation on a display of the display unit 4 and a pressing operation on the operation key by a user to the control unit 1.

The display unit 4 displays an operation screen, a status and the like according to a control signal from the control unit 1. A liquid crystal display (LCD) which performs dot matrix display, for example, is used as the display unit 4, although this is not especially limited.

The communication unit 5 is an interface for communicating with a server and the like on a network according to an instruction from the control unit 1 and is a module for wireless communication by a network card and a wireless LAN (IEEE 802.11n and the like), for example. The communication unit 5 receives the image data being a target of image formation and setting data related to a print job from an external device such as a computer and a printer server and outputs a status signal and the like.

The scanner 6 reads a document at a predetermined resolution and generates bitmap (pixmap) image data at the resolution in three colors (three wavelengths) of R (red), G (green), and B (blue). The generated image data is output to the image memory 8 to be held.

The print controller 7 performs various processes to convert the obtained image data to a format suitable for the image formation by the image forming unit 9. The print controller 7 is provided with an analyzing unit 71 which analyzes externally obtained PDL (page description language) data, a rasterizing unit 72 which performs a process (rasterizing process) to convert the analyzed data (intermediate data) to bitmap data (raster image data), an output processing unit 73 which performs a process to further convert the raster image data to image data for outputting according to the image forming unit 9 and the like. In the image forming device G of this embodiment, the print controller 7 is provided with dedicated storage unit and logic circuit such as a CPU, a RAM, and a HDD and each process by the analyzing unit 71, the rasterizing unit 72, and the output processing unit 73 is executed based on control of the CPU. Meanwhile, the processes may also be performed by the CPU of the control unit 1 together with other processes.

The rasterizing unit 72 generates the raster image data of four colors of C (cyan), M (magenta), Y (yellow), and K (black). The generated raster image data is output to the image memory 8 to be held.

The rasterizing unit 72 generates attribute data indicating an attribute of each pixel at the time of the rasterizing process. There is the attribute related to classification of area information such as a text (character) area, a graphic (graph) area, and an image (picture and photograph) area. This attribute may further include information related to an edge portion such as an edge attribute indicating an outline and an edge line of a line and a figure forming the character and the graph, a line width attribute and a line direction attribute of the line or the graph forming the edge and the like associated with the text attribute and the graphic attribute. The print controller 7 generates the attribute data in association with each pixel data by the rasterizing unit 72 based on an analysis result by the analyzing unit 71. The generated attribute data is output together with the raster image data.

The output processing unit 73 applies various types of image processing to the image data held in the image memory 8 and outputs the same to the image forming unit 9 after performing a positional deviation correcting process and a halftone process.

Figure 2:
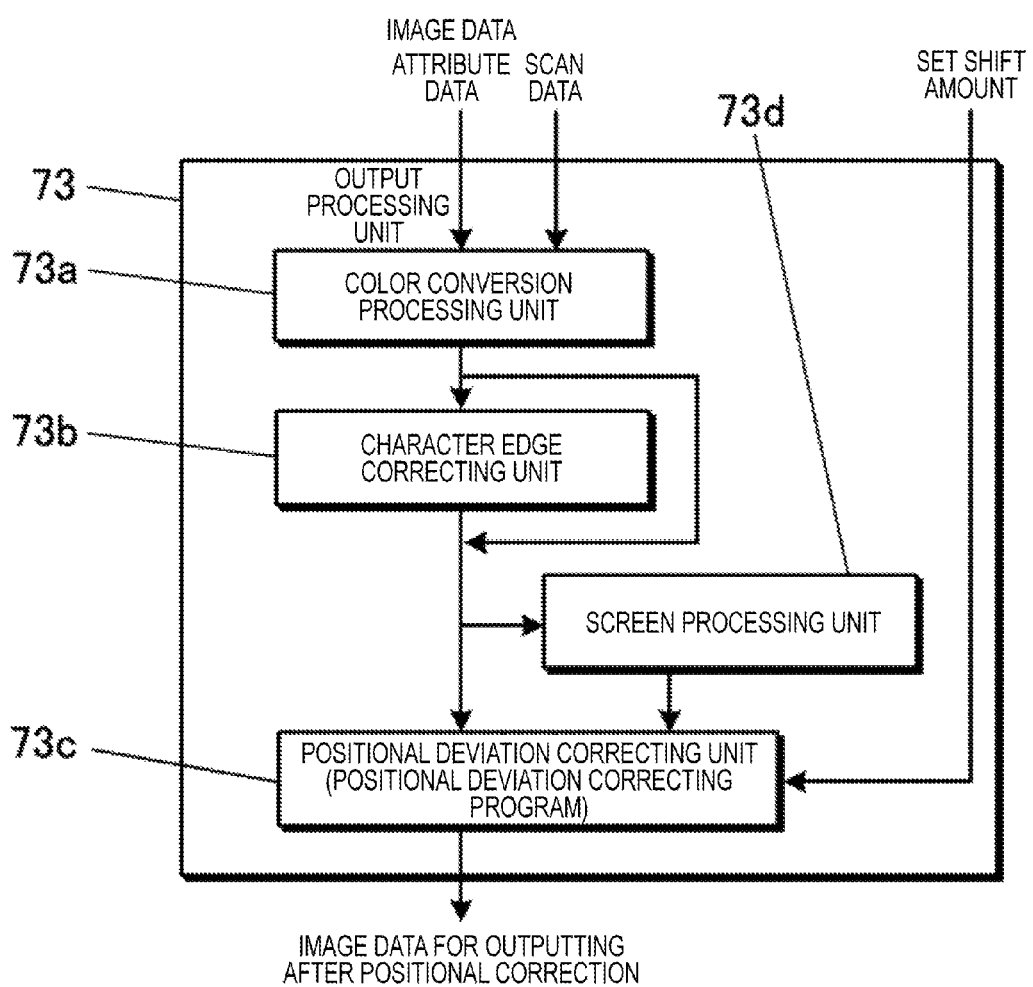
FIG. 2 is a block diagram illustrating a functional configuration of an output processing unit.

FIG. 2 is a block diagram illustrating a functional configuration of the output processing unit 73. The output processing unit 73 in the image forming device G of this embodiment is provided with a color conversion processing unit 73*a*, a character edge correcting unit 73*b* (character edge correcting means), a positional deviation correcting unit 73*c* (image correcting means), a screen processing unit 73*d* (screen process executing means) and the like.

The color conversion processing unit 73*a* performs the image processing related to color conversion such as to read the image data (scan data) of respective colors of R, G, B generated by the scanner 6 from the image memory 8 to perform the color conversion to the image data of C, M, Y, and K or to perform color correction of the raster images of the respective colors of C, M, Y, and K generated by the rasterizing unit 72.

The character edge correcting unit 73*b* performs various processes (character edge correcting process) to correct the edge portion of the character being one of the image processing performed on the raster image with character attribute information generated by the rasterizing unit 72. The character edge correcting process includes a reinforcing process, a smoothing process, and a thinning process of a character outline, for example. The process by the character edge correcting unit 73*b* may be omitted for the image to which the character attribute information is not assigned such as the scan data.

The positional deviation correcting unit 73*c* performs a process to correct positional deviation among the images of the respective colors of C, M, Y, and K formed on the recording medium and the positional deviation between the images formed on front and rear surfaces of the recording medium by software based on positional deviation information input from the control unit 1. The positional deviation correction includes an operation of scaling of the image. The positional deviation correcting unit 73*c* scales up or down a size of the image by increasing or decreasing the number of pixels of the image data based on information related to an enlarging amount or reducing amount (size changing information) input from the control unit 1.

The screen processing unit 73*d* performs a screen process using a dither matrix as one of the halftone processes. The dither matrix may be set in advance to be stored in the storage unit of the print controller 7. Alternatively, it is also possible to execute an error diffusing process, for example, as another halftone process. Herein, although all the processes by the processing units 73*a* to 73*d* are executed by software control based on an output processing program, a part or all of them may be performed by a dedicated hardware configuration.

The image memory 8 is a memory which temporarily holds the image data. A DRAM (dynamic random access memory) and the like may be used as the image memory 8. The image memory 8 stores the externally input image data and the image data processed by each unit of the print controller 7 until they are transmitted to a next process. It is also possible that the image data on which the color conversion is performed by the color conversion processing unit 73*a* of the output processing unit 73 is temporarily compressed to be stored in the image memory 8 and this is read according to the instruction related to the image formation from the control unit 1 to be expanded.

The image forming unit 9 forms the image on the recording medium based on the raster image data on which the halftone process is performed. Specifically, the image forming unit 9 is provided with a combination of an exposing unit, a developing unit, and a photoreceptor for each of the respective colors of C, M, Y, and K. The exposing unit optically scans the photoreceptor which is charged and rotated to form an electrostatic latent image by exposing a portion corresponding to each pixel of the photoreceptor with a light amount based on the image data. The developing unit develops the electrostatic latent image formed on the photoreceptor with toner. The images of the respective colors formed on the four photoreceptors in this manner are transferred to the recording medium so as to be overlapped with one another through an intermediate transfer belt and the like and a fixing process is performed thereon by a fixing device.

The image forming unit 9 may also have a configuration provided with a detecting unit for detecting a deviation amount among output positions of the images of the respective colors of C, M, Y, and K on the recording medium, for example, a shooting unit. Detection data is transmitted to the control unit 1 and the deviation amount (moving amount, rotational amount, and enlargement factor related to expansion and contraction or inserting amount or deleting amount of pixels related to the enlargement) is calculated to be output to the positional deviation correcting unit 73*c* as the control signal. The image processing device is formed of the print controller 7 and the image memory 8 out of the configurations. The image processing device may also include apart or all of the operation unit 3, the display unit 4, and the communication unit 5.

Next, an operation related to positional correction of the output image in the image processing device of this embodiment is described. In the image forming device G of this embodiment, the print controller 7 translates, rotationally moves, and/or scales up/down the image based on the deviation amount of the images of the respective colors of C, M, Y, and K calculated by using the detecting unit of the image forming unit 9 or externally obtained as the data to output to the image forming unit 9. Among them, in a scaling process, the print controller 7 adds or deletes the number of pixels according to the enlargement factor by the positional deviation correcting unit 73*c* and sequentially shifts the pixels subsequent to a position in which the pixel is added or deleted (pixel shift). At that time, the positional deviation correcting unit 73*c* selects a method of setting the position of addition or deletion according to a characteristic of the image of the area including the added or deleted pixel. Herein, the enlargement factor is obtained by indicating a size of the image data after the scaling in a scale factor (%) with respect to a size of original image data as 100%, so that this is larger than 100% at the time of enlargement and smaller than 100% at the time of reduction. The enlargement factor is not always the same in a main scanning direction (optical scanning direction by the exposing unit of the image forming unit 9 on the recording medium) and a sub scanning direction (direction orthogonal to the optical scanning direction in which the recording medium is conveyed) and may be different.

Figure 3A:
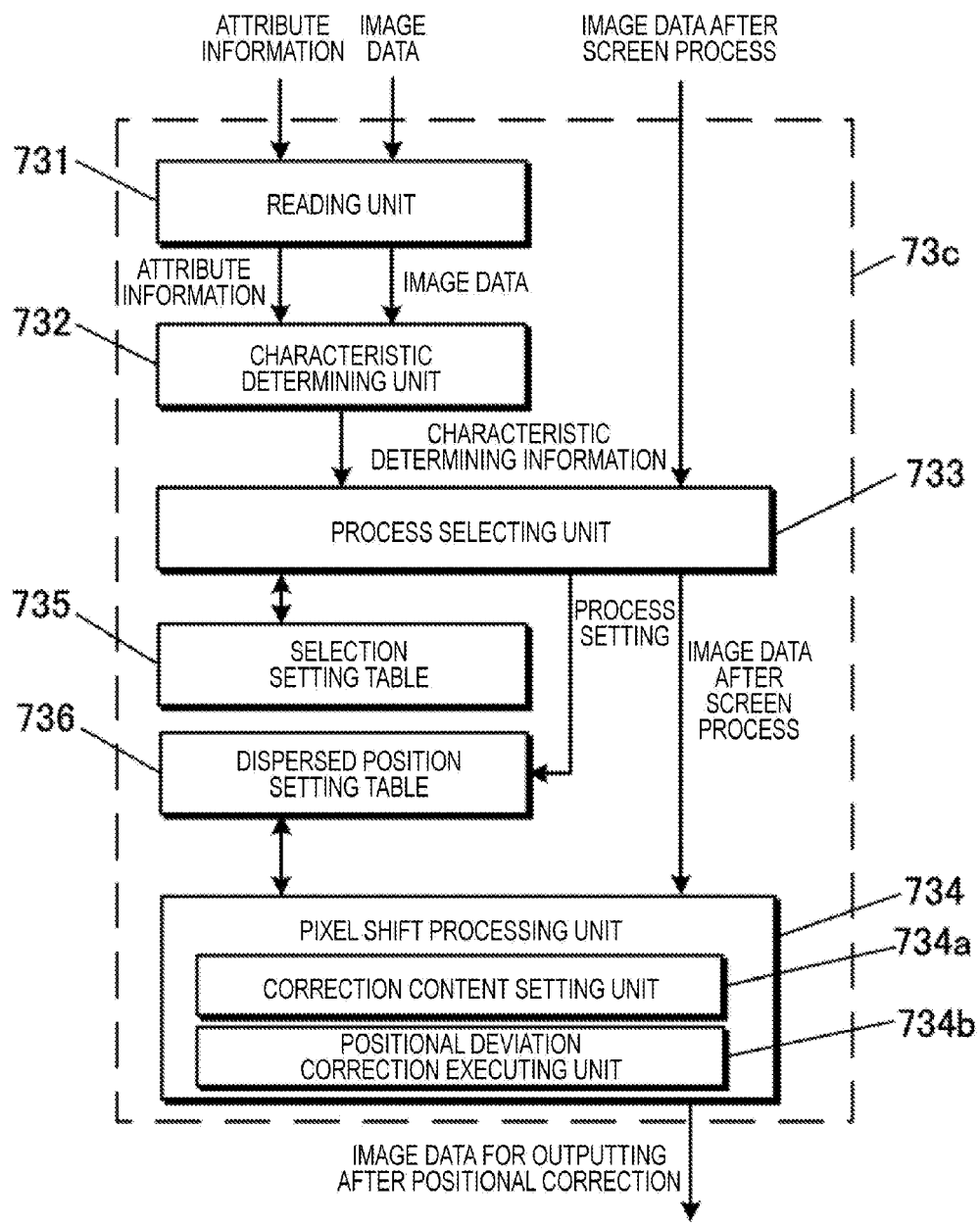
FIG. 3A is a view illustrating a functional block of a positional deviation correcting unit and FIG. 3B is a flowchart illustrating a control procedure of a positional deviation correcting process.

FIG. 3A is a diagram illustrating a functional block related to a positional deviation correcting operation of the positional deviation correcting unit 73*c*. The positional deviation correcting unit 73*c* includes a reading unit 731 (reading means), a characteristic determining unit 732 (characteristic determining means), a process selecting unit 733 (deforming process selecting means), and a pixel shift processing unit 734 (correction executing means). Each of the functional blocks may be a hardware configuration including a dedicated logic circuit and the like, a software configuration such as a function and a routine called in the control program executed by the CPU of the print controller 7, or may be a combination thereof. Setting related to the selection of the setting method may be changed based on an input operation by the user to the operation unit 3.

The reading unit 731 reads the image of a predetermined peripheral range (M×N pixel range) including an attention target pixel (pixel of interest) from the image data being the target of the image formation and obtains the attribute data to the pixel of interest when this is set. Herein, M and N are integral numbers not smaller than one and M and N are set to one when all necessary information to be described later is included in the attribute data. When the information of the attribute data might be insufficient, M and N are set to three, for example. Alternatively, it is also possible to read the range of M=3 and N=9 at that time as data of an adjacent range to be described later.

The characteristic determining unit 732 determines the characteristic of the image data of the read peripheral range. The characteristic herein determined is a thickness, a length, and a direction of the line in the area having the text attribute and the graphic attribute, and when the above-described edge attribute, line width attribute, and line direction attribute are set as the attribute data to the pixel of interest, the attributes may be used. When the attributes are not set in the area having the text attribute and the graphic attribute, the characteristic determining unit 732 detects the edge by performing pattern recognition on the obtained image data of a predetermined range and determines the characteristic related to a line width and a line direction based on continuity and distribution of the characteristics in the area adjacent to the pixel of interest (adjacent range). Herein, the pixel forming the edge includes an inner boundary (pixel forming an outer frame of the line) and an outer boundary (pixel adjacent to the line) of the line. When the pixel is multi-valued and the boundary is not clear, it is possible to determine by setting an appropriate range. A portion in which a plurality of lines cross or folded or a fine structure portion such as an upward turn or a sweeping stoke at the end of the line forming the character are separately characterized as a fine portion.

The process selecting unit 733 selects the setting method (deforming process) related to the position in which the pixel is added or deleted and density of the added pixel and a peripheral pixel of the added or deleted pixel when the pixel is added to or deleted from the image of the above-described predetermined range. Each setting method and selecting method are described later in detail.

The pixel shift processing unit 734 is provided with a correction content setting unit 734a (correction content setting means) and a positional deviation correction executing unit 734b (correction content executing means). The correction content setting unit 734a determines the position in which the pixel is added or deleted based on information related to the number of pixels to be added or deleted and the setting method selected by the process selecting unit 733. When the number of correction pixels to be added or deleted is obtained, the correction content setting unit 734a determines the number of pixels as a block unit in which one pixel is added or deleted by dividing the total number of pixels in a width direction in which the pixels are added or deleted by the number of correction pixels. Then, the position in which the pixel is added or deleted in each block in the raster image is determined. The positional deviation correction executing unit 734b performs the correction of the positional deviation on entire raster image data on which the screen process is already performed by sequentially executing the process related to the addition or deletion of the pixel specifically set by the correction content setting unit 734a in order in each block.

Figure 3B:
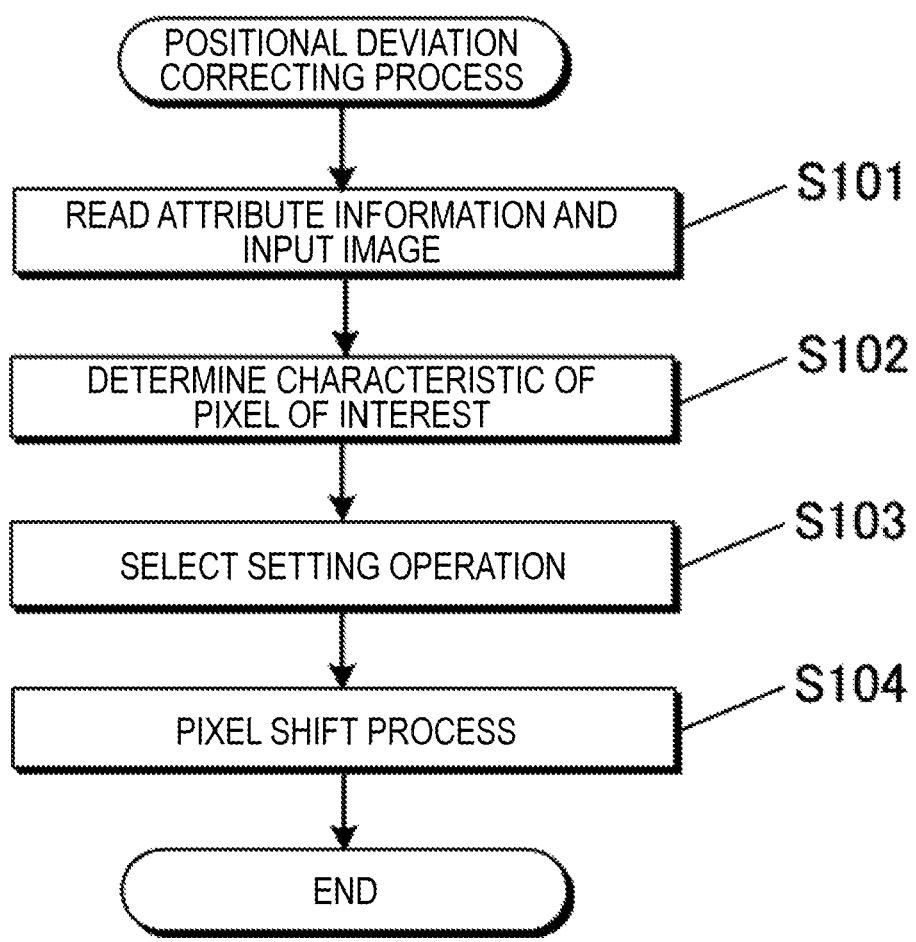

FIG. 3B is a flowchart illustrating a control procedure by the CPU of the positional deviation correcting process executed by the software by the positional deviation correcting program called in the output processing program.

The control procedure of the positional deviation correcting process is similar to a flow of the process illustrated in the above-described functional block. That is to say, the CPU first reads the attribute information and the input image (step S101). Next, the CPU determines the characteristic of the pixel of interest based on the read information (step S102).

The CPU selects the setting method related to the position in which the pixel is added and the density of the added pixel and the peripheral pixel of the pixel to the added or deleted when the pixel is added to or deleted from the image (step S103). The CPU determines the position in which the pixel is added or deleted based on the information related to the number of pixels to be added or deleted by the selected setting method and executes the process to add or delete the pixel to and from the raster image according to the determination (step S104). Then, the CPU finishes the positional deviation correcting process.

Figure 4:
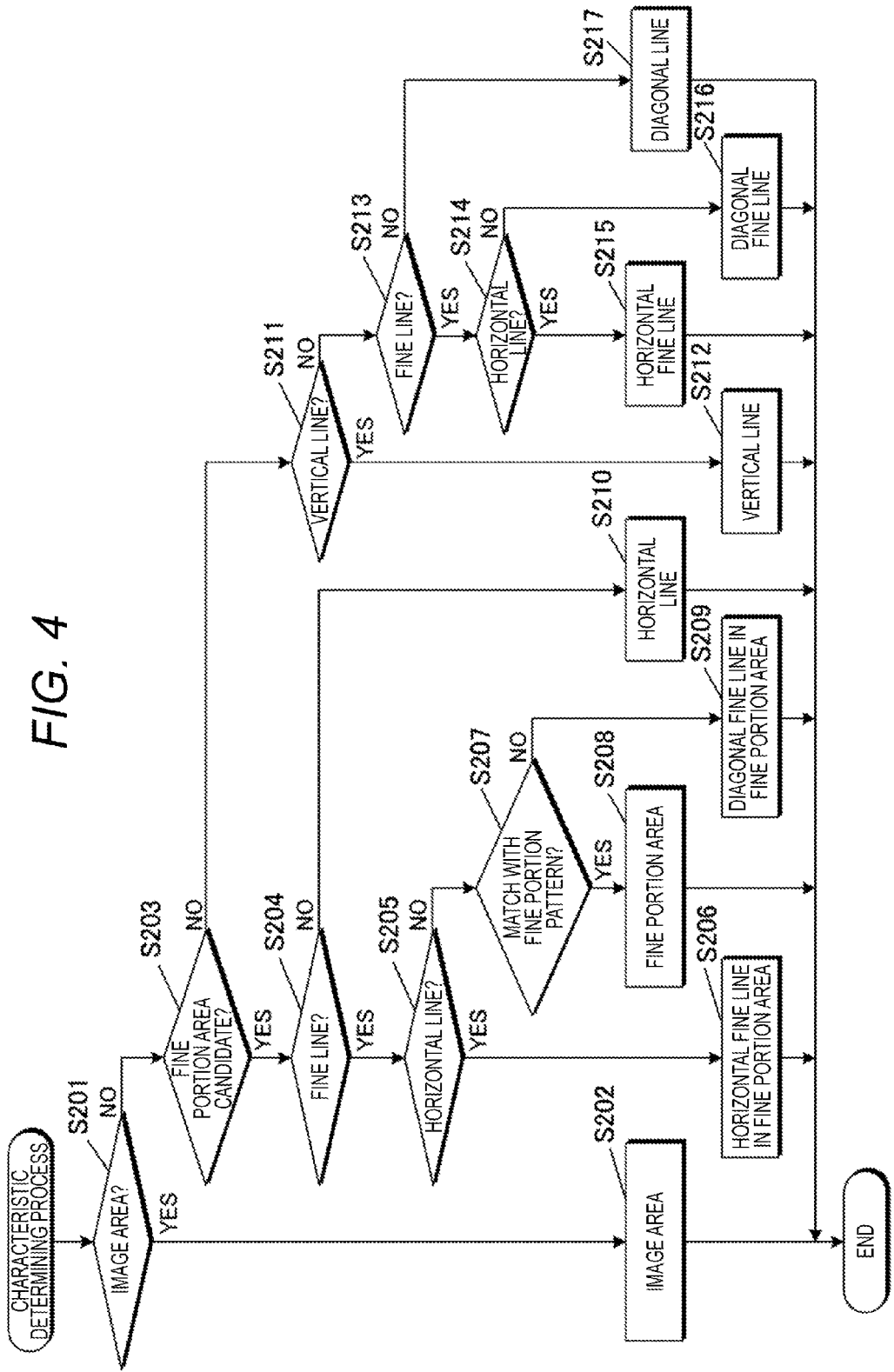
FIG. 4 is a flowchart illustrating a control procedure of a characteristic determining process in a characteristic determining unit.

FIG. 4 is a flowchart illustrating a control procedure of a characteristic determining process by the characteristic determining unit 732. The characteristic determining process is repeatedly called to be executed each time the process by the characteristic determining unit 732 is performed for each pixel of target. Herein, the characteristic determining process required when the pixel is inserted or deleted based on the scaling in the sub scanning direction is described.

When the characteristic determining process is started, the CPU of the print controller 7 first determines whether the attribute of the pixel of interest is the image attribute (step S201). When this is determined to be the image attribute ("Yes" in step S201), the CPU sets "image" as the characteristic of the area (step S202). Then, the characteristic determining process is finished.

When this is determined not to be the image attribute, that is to say, when this is the text attribute or the graphic attribute ("No" in step S201), the CPU determines whether the pixel of interest might be that in a fine portion area (step S203). Specifically, the CPU determines whether "fine portion area" is set in the attribute of the pixel of interest or whether there is the edge in all rows (three rows) in the area in the adjacent range including the pixel of interest in the substantially center thereof (for example, 3×9 pixel area).

When it is determined that this might be that in the fine portion area ("Yes" in step S203), the CPU next determines whether the edge related to the pixel of interest is that of a fine line in the fine area (step S204). Specifically, the CPU determines whether the line width is not wider than a predetermined pixel width, for example, the width of two pixels in the line width attribute, or whether the line related to the edge line detected in the above-described adjacent range is not wider than the width of two pixels, or none of them is applicable. When this is determined not to be that of the fine line ("No" in step S204), the CPU determines that the characteristic of the detected edge line is "horizontal line" (herein, the line extending in the main scanning direction) (step S210) and finishes the characteristic determining process.

When this is determined to be that of the fine line ("No" in step S204), the CPU further determines whether the fine line is a horizontal line (step S205). Specifically, the CPU determines whether "horizontal line" is set in the line direction attribute or whether the edge line detected in the above-described adjacent range is continuous in a horizontal direction in the adjacent range. When this is determined to be the horizontal line ("Yes" in step S205), the CPU determines that the characteristic of the edge line is "horizontal fine line" in the fine portion area (step S206) and finishes the characteristic determining process.

When this is determined not to be the horizontal line ("No" in step S205), the CPU further performs matching of the adjacent range with a predetermined fine pattern to determine whether they substantially identical to each other (step S207). The predetermined fine pattern includes a pattern in which unevenness of every other line or every plural lines is present in the edge line detected in the adjacent range, a lattice pattern and the like.

When this is determined to match with the fine pattern ("Yes" in step S207), the CPU determines that the characteristic of the pixel of interest is "fine portion area" (step S208) and finishes the characteristic determining process. On the other hand, when this is determined not to match with the fine pattern ("No" in step S207), the CPU determines that the characteristic of the pixel of interest is "diagonal fine line" in the fine portion area (step S209) and finishes the characteristic determining process.

When it is determined that there is no possibility that the pixel of interest is that in the fine portion area in the determining process in step S203 ("No" in step S203), the CPU determines whether the edge line related to the attention target pixel forms a vertical line (herein, line extending in the sub scanning direction) (step S211). Specifically, the CPU determines whether "vertical line" is set in the line direction attribute or whether the edge line including the attention target pixel is localized in the main scanning direction and is continuous in the sub scanning direction. When this is determined to form the vertical line ("Yes" in step S211), the CPU determines that the characteristic of the edge line of the attention target pixel is "vertical line" (step S212) and finishes the characteristic determining process.

When the edge line is determined not to belong to the vertical line ("No" in step S211), the CPU determines whether the edge line of the pixel of interest forms the fine line (step S213). That is to say, the fine line herein determined is the fine line which is not included in the fine portion area. Specifically, the CPU determines whether there is the edge line in only one or two rows of the three rows in the adjacent range and this forms a completely horizontal fine line extending in the horizontal direction or a diagonal fine line simply diagonally extending in the adjacent range.

When the edge line of the pixel of interest is determined to form the fine line ("Yes" in step S213), the CPU determines whether the fine line is the horizontal line (step S214). When this is determined to be the horizontal line ("Yes" in step S214), the CPU determines that the characteristic of the edge line related to the pixel of interest is "horizontal fine line" (step S215) and finishes the characteristic determining process. On the other hand, when this is determined not to be the horizontal line ("No" in step S214), the CPU determines that the characteristic of the edge line forming the pixel of interest is "orthogonal fine line" (step S216) and finishes the characteristic determining process.

When this is determined not to form the fine line ("No" in step S213), the CPU determines that the characteristic of the edge line related to the pixel of interest is normal "diagonal line" (step S217) and finishes the characteristic determining process.

When the above-described characteristic determining process is applied to the scaling in the main scanning direction, it is required to determine a vertical fine line in place of the horizontal fine line. In a case in which the line width attribute and the line direction attribute are set, when it shifts to "No" in the process in step S205, the vertical fine line in the fine area is determined by determining whether the fine line is the vertical line based on the line direction attribute, and when it shifts to "Yes" in the determining process in step S211, the vertical fine line is determined by determining whether the edge line is the fine line based on the line width attribute. On the other hand, when the line width attribute and the line direction attribute are not set and when the scaling in the main scanning direction and that in the sub scanning direction are performed as different processes, it is possible to detect the vertical fine line by changing the area used for the fine line determination into a shape extending in the sub scanning direction of 9×3 pixels and changing the portion related to the detection of the horizontal line and the portion related to the detection of the vertical line.

Next, the setting method which may be selected by the process selecting unit 733 and used by the pixel shift processing unit 734 is described. FIGS. 5A to 5C and 6A to 6H are views illustrating examples of the images on which the deforming process is performed by the setting method which may be selected to be used by the image processing device of this embodiment.

In the image processing device of this embodiment, the deforming processes by four setting methods of neighborhood pixel movement, neighborhood pixel averaging, dispersed neighborhood pixel movement, and dispersed neighborhood pixel averaging may be selected to be used.

Figure 5A:
FIGS. 5A to 5C are views illustrating an example of an image on which a deforming process is performed by a setting method which may be selected and used by the image processing device.
Figure 5B:

When the process related to the neighborhood pixel movement or the neighborhood pixel averaging is performed, the position of the pixel inserted or deleted in one block is fixed to one sub scanning position, that is to say, on the same main scanning line (row). In the example of the input image illustrated in FIG. 5A, four horizontal lines having a width of two pixels drawn in parallel with an interval having a width of two pixels are illustrated. When the process related to the neighborhood pixel movement is performed on the input image, as illustrated in FIG. 5B, when it is determined to insert the pixel into a row that follows a predetermined row, herein, a row b1, the pixel value of each pixel of the row b1 is copied to be made the pixel value of each pixel of an inserted row b2. Herein, each pixel value of the row b1 being a black line (pixel value=255) is copied as each pixel data of the row b2. On the other hand, when the pixels of one row are deleted, it is only required that the pixel data of the row to be deleted is simply deleted and the interval is closed.

Figure 5C:
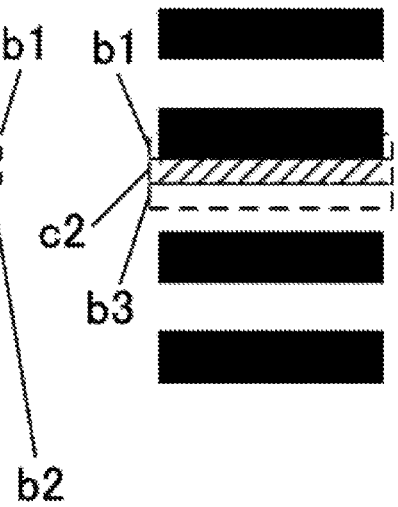

When the process related to the neighborhood pixel averaging is performed, as illustrated in FIG. 5C, when it is determined to insert the pixel between predetermined rows b1 and b3, the pixel value of each pixel of a row c2 is a value obtained by averaging the pixel values of the pixels in the same column (pixel column) of the preceding and following rows b1 and b3. Herein, the pixel value of each pixel of the row c2 inserted between the black line (pixel value=255) in the row b1 and a background portion (pixel value=0) in the row b3 is 128 which is obtained by rounding off the average value. Alternatively, it is also possible to insert a value obtained by predetermined weighted averaging of the pixel values of the pixels of a plurality of preceding and following rows. In contrast, when the pixel is deleted, the pixel values of the pixels above and below the pixel to be deleted are changed to the averages of the pixel values of the pixels and the pixel value of the pixel to be deleted.

On the other hand, when the process related to the dispersed neighborhood pixel averaging or the dispersed neighborhood pixel movement is performed, the pixels inserted or deleted are not those of the same row but of the different rows for each column. The rows into or from which the pixels are inserted or deleted are not necessarily different in all the columns, but are preferentially different positions between adjacent columns in the main scanning direction and it is possible to select from a plurality of patterns, for example, blue noise, white noise and the like to determine according to the characteristic of the area to which the process is applied.

For example, it is set such that the pixels are inserted into positions indicated by horizontal bold lines in FIG. 6B for an original image illustrated in FIG. 6A.

Setting of such insertion positions may be held as an LUT (look-up table) in advance. A dispersed position setting table 736 (dispersed position table outputting means, dispersed position determining table) may hold a plurality of LUTs according to one or the above-described plurality of patterns of the table of the predetermined number of rows and columns to be output. When frequency of insertion of the pixel (that is to say, the number of rows and columns of the block in which one pixel is inserted) is determined, it is possible to select the LUT having a size similar to a size of the block and normalize the same to use. For example, when one pixel is inserted for every 15 pixels, it is possible to select the LUT for inserting one pixel for every 10 pixels and multiply the insertion position determined by the LUT by 15/10. Alternatively, it is also possible to set the insertion position by allowing a random number generator related to the pattern to generate a numerical sequence each time the pattern is set.

When the pixel is inserted by the dispersed neighborhood pixel averaging process, when the insertion position of the pixel is set, the pixel value of this pixel is a weighted average of the pixel values of the preceding and following pixels. When the process related to the dispersed neighborhood pixel averaging is performed by inserting the pixels into the positions illustrated in FIG. 6B for the original image illustrated in FIG. 6A, as illustrated in FIG. 6C, each of the pixel values of the inserted pixels indicated by bold frames is 0 (white), 255 (black), or 128 (hatch) according to the values of the preceding and following pixels of the position. In the process related to the dispersed neighborhood pixel averaging, each of the pixel values of the predetermined number of pixels (herein, four) that follow the inserted pixel (downstream in the sub scanning direction) is the weighted average of the pixel values of this pixel and the next pixel in the input image. Although a weight coefficient is herein simply one to one, this may be appropriately set and may be variously changed in the predetermined number of pixels. On the other hand, when the pixel is deleted, an effect related to the deletion of the pixel is distributed to the peripheral pixels in the same column. Specifically, each of the pixel values of the predetermined number of preceding and following pixels of the deleted pixel is set to the weighted average of the pixel values of this pixel and the next pixel in the input image.

When the pixel is inserted by the dispersed neighborhood pixel moving process, when the insertion position of the pixel is set, the pixel value of the pixel in the preceding position is copied to be used as the pixel value of this pixel. When the process related to the dispersed neighborhood pixel movement is performed by inserting the pixel into the positions illustrated in FIG. 6B for the original image illustrated in FIG. 6A, as illustrated in FIG. 6D, each of the pixel values of the inserted pixels indicated by the bold frames is 0 or 255 depending on the pixel value of the pixel in the preceding position.

When the size of the LUT and the size of the image (image area) are different from each other, for example, if the length is four times longer than that of the insertion position setting table illustrated in FIG. 6B as illustrated in FIG. 6E, coordinates of the insertion positions of the pixels and distribution thereof in FIG. 6B are enlarged four times as illustrated in FIG. 6F. As a result, when the process related to the dispersed neighborhood pixel averaging is performed, it is deformed as illustrated in FIG. 6G, and when the process related to the dispersed neighborhood pixel movement is performed, it is deformed as illustrated in FIG. 6H.

Next, a criterion of a selecting operation by the process selecting unit 733 is described. The criterion of the selecting operation is appropriately set mainly based on the characteristic determined by the above-described characteristic determining process and a property of the image forming unit 9 (model of the image forming device G). It may also be configured such that the setting is changed according to a usage condition of the image forming device G. A selection setting table 735 indicating correspondence relationship between the characteristic and a set operation set for each model in this manner may be stored in the storage unit of the print controller 7 so as to be updatable. In this case, it is also possible to enable return to initial setting according to component replacement without erasing the initial setting.

An example of the criterion of the selecting operation is as follows: herein, if the neighborhood pixel movement is performed in a direction perpendicular to the horizontal line or when the neighborhood pixel movement is performed in a direction horizontal to the vertical line, the line becomes thicker to be separated from its original shape, so that the dispersed neighborhood pixel averaging is preferably used in such cases. However, when the dispersed neighborhood pixel averaging is used to the fine line, the line might fade away, so that there is a case in which it is preferable to clearly output the fine line by the process by the neighborhood pixel movement when the image forming device G provided with such image forming unit 9 is used.

For example, when the dispersed neighborhood pixel averaging or the dispersed neighborhood pixel movement is performed on the fine diagonal line, the line might be interrupted or fade away, so that the neighborhood pixel movement and the neighborhood pixel averaging are preferably used in such a case.

For example, in a case of the character, especially, the character having an interlaced fine portion structure such as a Chinese character, the neighborhood pixel averaging is preferably used without dispersing for the fine portion structure area so as to avoid deformation of an entire structure or disappearance of a blank space.

Figure 7A:
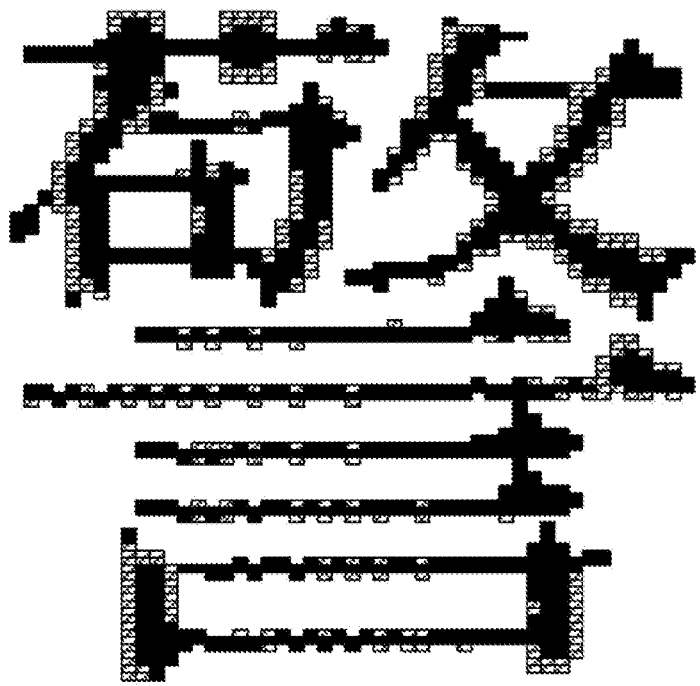
FIG. 7A is a view illustrating an image example of a character area and FIG. 7B is a view illustrating a specific example of a result of process selection.
Figure 7B:
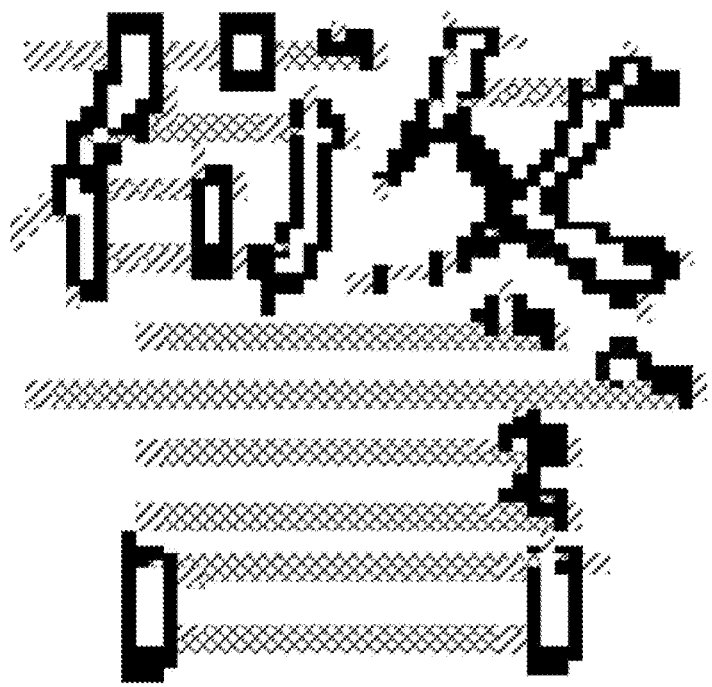

FIGS. 7A and 7B are views illustrating specific examples of the image of the character area and a result of the process selection thereof, respectively. In FIG. 7A, a gray-scale image obtained by rasterizing the Chinese character "營" by the rasterizing unit 72 is illustrated. In this manner, when the character is rasterized, the outline of the character, that is to say, the line having the edge in which the pixel value drastically changes with a width of zero to one pixel appears in each of the horizontal direction, the vertical direction, and a diagonal direction, and the lines intersect one another to form the fine portion.

FIG. 7B is the view of the result obtained by classifying the character image illustrated in FIG. 7A according to the characteristics based on the above-described determining criterion. Herein, this is classified into a black portion (neighborhood pixel averaging), a shaded portion (dispersed neighborhood pixel averaging), a diagonally hatched portion (neighborhood pixel movement), and a white blank portion (dispersed neighborhood pixel movement). The black portion often appears in the edge of a bold line, the diagonal line, and the vertical line. The shaded portion often appears in the fine horizontal line portion. The diagonally hatched portion often appears at the end of the horizontal fine line and an intersection between the horizontal fine line and the black portion. The white blank portion often appears in a blank portion and inside the black portion.

The selection setting table 735 may be manually rewritten by an operation input by the user to the operation unit 3.

Furthermore, it is also possible that the user performs the input operation related to the selection of the setting method (selection instruction) and directly set as temporal setting at the time of the image formation separate from the setting of the selection setting table 735.

A pixel shift processing operation by the pixel shift processing unit 734 is next described. When setting about the determination of the position of the inserted or deleted pixel, calculation of the pixel value of the inserted pixel, and change of the pixel value of the peripheral pixel of the inserted or deleted pixel is performed based on the raster image being the target of the image formation by the process selecting unit 733, the pixel shift processing unit 734 next determines the position in which the pixel is added or deleted based on the setting.

At that time, in this embodiment, there is a case in which the methods of determining the position of the inserted or deleted pixel are finely interlaced according to distribution of the areas according to the characteristics. Therefore, for example, when the pixel insertion positions are to be dispersed based on the setting of the LUT in the area in which the pixel is inserted or deleted by the dispersed neighborhood pixel averaging, the position might protrude from the area. In this case, the pixel insertion position is newly set based on the method of setting in the area in which this protrudes. When the pixel range in which the pixel value is changed by the dispersed neighborhood pixel averaging protrudes from the area of the dispersed neighborhood pixel averaging, the process to change the pixel value is not performed in the protruded area.

When all the specific operation contents to each pixel are determined, the pixel shift processing unit 734 performs an actual process on the raster image data on which the screen process is already performed. At that time, when the pixel shift process is performed in both the main scanning direction and the sub scanning direction, the pixel shift process is first performed in the sub scanning direction and thereafter performed in the main scanning direction in this embodiment, although this is not especially limited.

In this case, the pixel shift in the main scanning direction is performed on the raster image on which the pixel shift in the sub scanning direction is already performed; in the pixel shift in the main scanning direction, it is possible to determine the insertion position for the pixel position before the pixel shift in the sub scanning direction is performed based on the setting related to the pixel shift first performed. As a result, one result of determination performed in advance by the characteristic determining unit 732 may be commonly used for the characteristic of each pixel used in the setting related to the pixel shift in the sub scanning direction and the characteristic of each pixel used in the setting related to the pixel shift in the main scanning direction. Meanwhile, as for the row into which the pixel is inserted by the neighborhood pixel movement or the neighborhood pixel averaging in the pixel shift in the sub scanning direction, a case in which the setting related to the pixel shift in the main scanning direction is not performed might occur, so that the process selection of this row is additionally performed in this case.

When the process related to the pixel shift in the sub scanning direction and in the main scanning direction is finished, the image the positional deviation of which is corrected by the pixel shift is output to the image forming unit 9 as the image data for outputting to be used in the image formation on the recording medium.

In the above-described manner, the image processing device provided in the image forming device G of this embodiment is the image processing device provided with the positional deviation correcting unit 73c which corrects the size of the raster image by inserting or deleting the predetermined number of pixels into or from the image based on the size changing information of the raster image, the device provided with the reading unit 731 which reads at least one of the attribute data corresponding to data of the pixel of interest and the pixel data in the predetermined peripheral range including the pixel of interest, the characteristic determining unit 732 which determines the characteristic of the pixel of interest in the raster image from the data read by the reading unit 731, the process selecting unit 733 which selects a type of the deforming process related to the determination of the position in which the pixel is inserted or deleted and the determination of the pixel value of the pixel in the predetermined range from the inserted or deleted pixel based on the determined result of the characteristic determining unit 732 from a plurality of types set in advance, and the pixel shift processing unit 734 which executes the deforming process selected by the process selecting unit 733. That is to say, the output image is classified into the areas according to the characteristics of elements and the positional deviation is corrected by using the deforming process suitable for each classification, so that it is possible to inhibit deterioration in an entire image even by the scaling process related to the positional deviation correction on the image in which a plurality of characteristic areas such as line elements of the graph and the character are mixed.

At least one of the area information to classify a plurality of areas including the image area, the graphic area, and the text area and the information related to the edge portion of the graph and the character is included in the attribute data, and the characteristic determining unit 732 determines the direction in which the line extends and the line width or the fine portion in the graphic area and the text area based on the continuity of the information related to the edge portion in the pixels in a predetermined adjacent range including the pixel of interest. Therefore, it is possible to finely set the type of an appropriate deforming process especially based on the direction and the thickness of the line element in the graphic area and the text area, so that the line element is not deformed to be deteriorated and image quality is not deteriorated.

When the read data is the pixel data, the characteristic determining unit 732 determines the area and determines the direction in which the line extends and the line width or the fine portion in the determined graph area and character area based on presence of the continuity of the pixel values of the pixels in the predetermined adjacent range including the pixel of interest and a direction of arrangement and a width of the continuous pixels by using the data of the image before the screen process is performed. Therefore, it is possible to perform the correcting process by accurately determining required outline and edge portion of the line element even with the image an attribute value of which is not set or not sufficiently set, so that it is possible to inhibit the deformation and deterioration of the line element.

The process selecting unit 733 selects any one of the neighborhood pixel moving process, the neighborhood pixel averaging process, the dispersed neighborhood pixel moving process, and the dispersed neighborhood pixel averaging process. Therefore, it is possible to perform the image correction by selecting the deforming process capable of appropriately avoiding deterioration in line quality supposed from the direction in which the line extends, the line width, and the fine portion structure.

When the process selecting unit 733 selects the dispersed neighborhood pixel moving process or the dispersed neighborhood pixel averaging process, it is possible to select the setting related to the insertion position or the deletion position of the pixel from the LUTs set based on a plurality of different methods to be stored in the dispersed position setting table 736 to output, and the process selecting unit 733 selects an appropriate LUT according to the characteristic determined by the characteristic determining unit 732 when selecting the dispersed neighborhood pixel moving process or the dispersed neighborhood pixel averaging process. Therefore, it is possible to appropriately disperse the insertion positions or the deletion positions of the pixels according to the characteristic of the line element, so that it is possible to further inhibit the image quality deterioration of the line element.

The operation unit 3 which receives the operation by the user is provided, and when the input related to the selection instruction of the deforming process is performed to the operation unit 3, the process selecting unit 733 selects the deforming process related to the selection instruction. Therefore, when the user wants to change the type of the deforming process on a temporal condition or when the type of the changing process different from the selection of the process selecting unit 733 is preferable according to an object and application of the image output, it is possible to manually select the appropriate deforming process to perform.

The pixel shift processing unit 734 separately performs the deforming process in the sub scanning direction and the deforming process in the main scanning direction in order, and the process selecting unit 733 collectively selects the type related to the deforming process in the sub scanning direction and the type related to the deforming process in the main scanning direction based on the characteristic once determined by the characteristic determining unit 732. That is to say, it is not required to perform the process related to the characteristic determination twice for the deforming process in the two directions, so that a process load may be inhibited.

The character edge correcting unit 73b which performs predetermined correction on the pixel value in the vicinity of the edge portion of the character based on the information related to the edge portion of the character is provided, and the process of the pixel shift processing unit 734 in the positional deviation correcting unit 73c is performed on the image data which is already corrected by the character edge correcting unit 73b, so that there is no danger of inaccurate edge correction due to the deviation of the information of the edge portion by the process of the pixel shift processing unit 734 at the time of the correction of the character edge.

[First Variation]

Figure 8A:
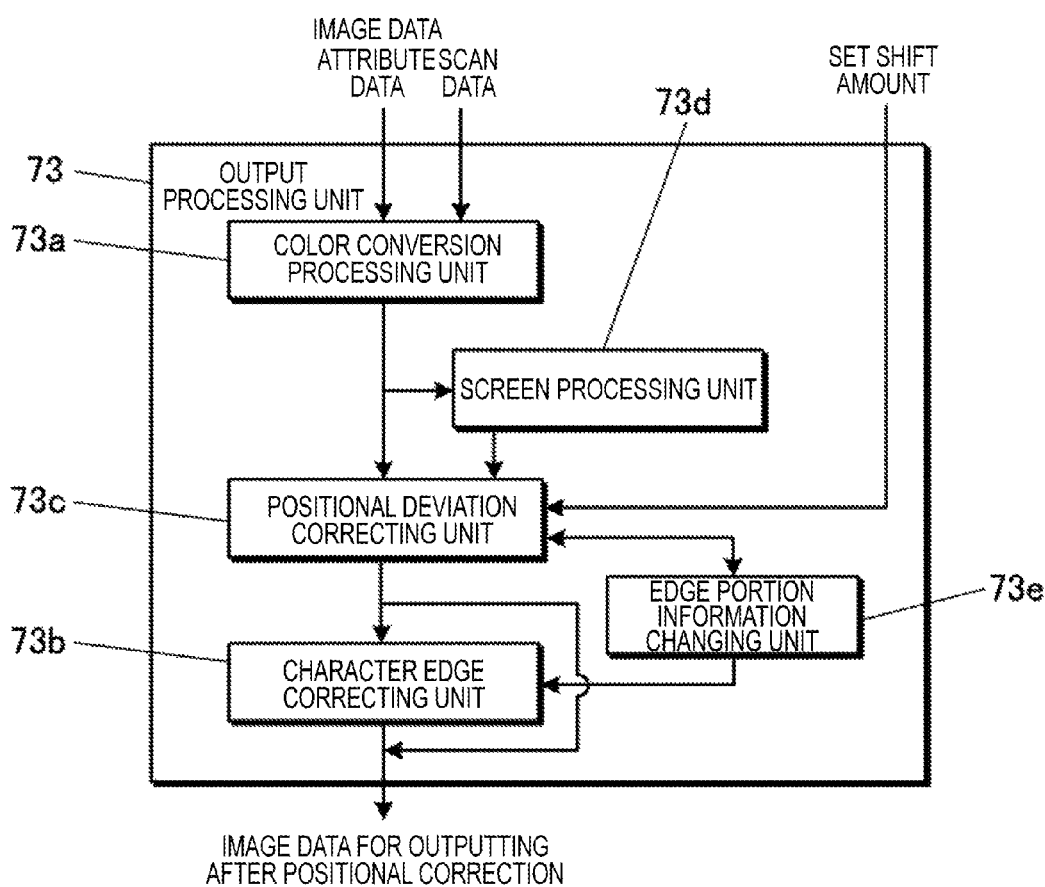
FIGS. 8A and 8B are functional block diagrams illustrating a variation of an output processing unit.
Figure 8B:
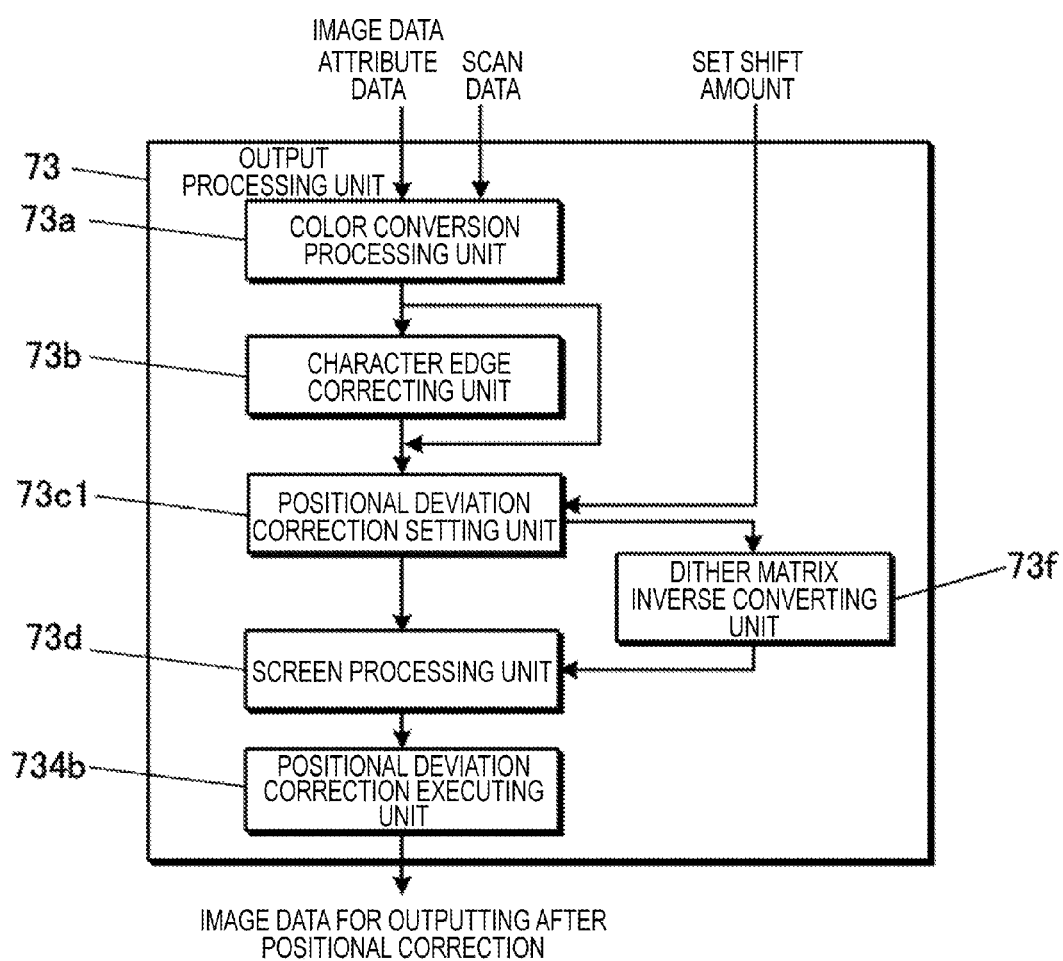

Next, a variation of an image forming device G is described. FIGS. 8A and 8B are functional block diagrams illustrating a variation of an output processing unit 73 in the image forming device G of the above-described embodiment.

In the output processing unit 73 in the first variation illustrated in FIG. 8A, as compared to the output processing unit 73 in the above-described embodiment, a character edge correcting unit 73b is located behind a positional deviation correcting unit 73c. An edge portion information changing unit 73e for a process performed for the character edge correcting unit 73b based on a process of the positional deviation correcting unit 73c is added.

The edge portion information changing unit 73e corrects an edge attribute related to an edge line deformed by the process of the positional deviation correcting unit 73c according to the deformation. The attribute related to each pixel after being deformed by the positional deviation correction is correctly held in this manner, so that correction of the character edge portion by the character edge correcting unit 73b performed thereafter is accurately performed without deviation.

In this manner, the output processing unit 73 of this variation is provided with the character edge correcting unit 73b and the edge portion information changing unit 73e, a process by a pixel shift processing unit 734 of the positional deviation correcting unit 73c is performed before a correcting process by the character edge correcting unit 73b, and when information of the edge portion is corrected by the edge portion information changing unit 73e when the edge portion is deviated along with the process of the pixel shift processing unit 734 and then the process by the character edge correcting unit 73b is performed, the edge is corrected based on the information of the corrected edge portion. Therefore, it is possible to correct the positional deviation without deterioration of the character based on initial edge information and accurately correct the character edge in the image thereafter based on the correct edge information after the positional deviation correction.

[Second Variation]

On the other hand, in an output processing unit 73 of a second variation illustrated in FIG. 8B, as compared to the output processing unit 73 in the above-described embodiment, the positional deviation correcting unit 73c is divided into a positional deviation correction setting unit 73c1 and a positional deviation correction executing unit 734b and a screen processing unit 73d is located between the positional deviation correction setting unit 73c1 and the positional deviation correction executing unit 734b. A dither matrix inverse converting unit 73f for the screen processing unit 73d is added.

The positional deviation correction setting unit 73c1 sets only a specific operation content related to positional deviation correction and this herein collectively indicates processes of a reading unit 731, a characteristic determining unit 732, a process selecting unit 733, and a correction content setting unit 734a in a pixel shift processing unit 734.

The dither matrix inverse converting unit 73f performs a process to inversely convert a dither matrix used in a screen process in the screen processing unit 73d in expectation of deformation related to a correcting process by the positional deviation correction executing unit 734b.

Figure 9:
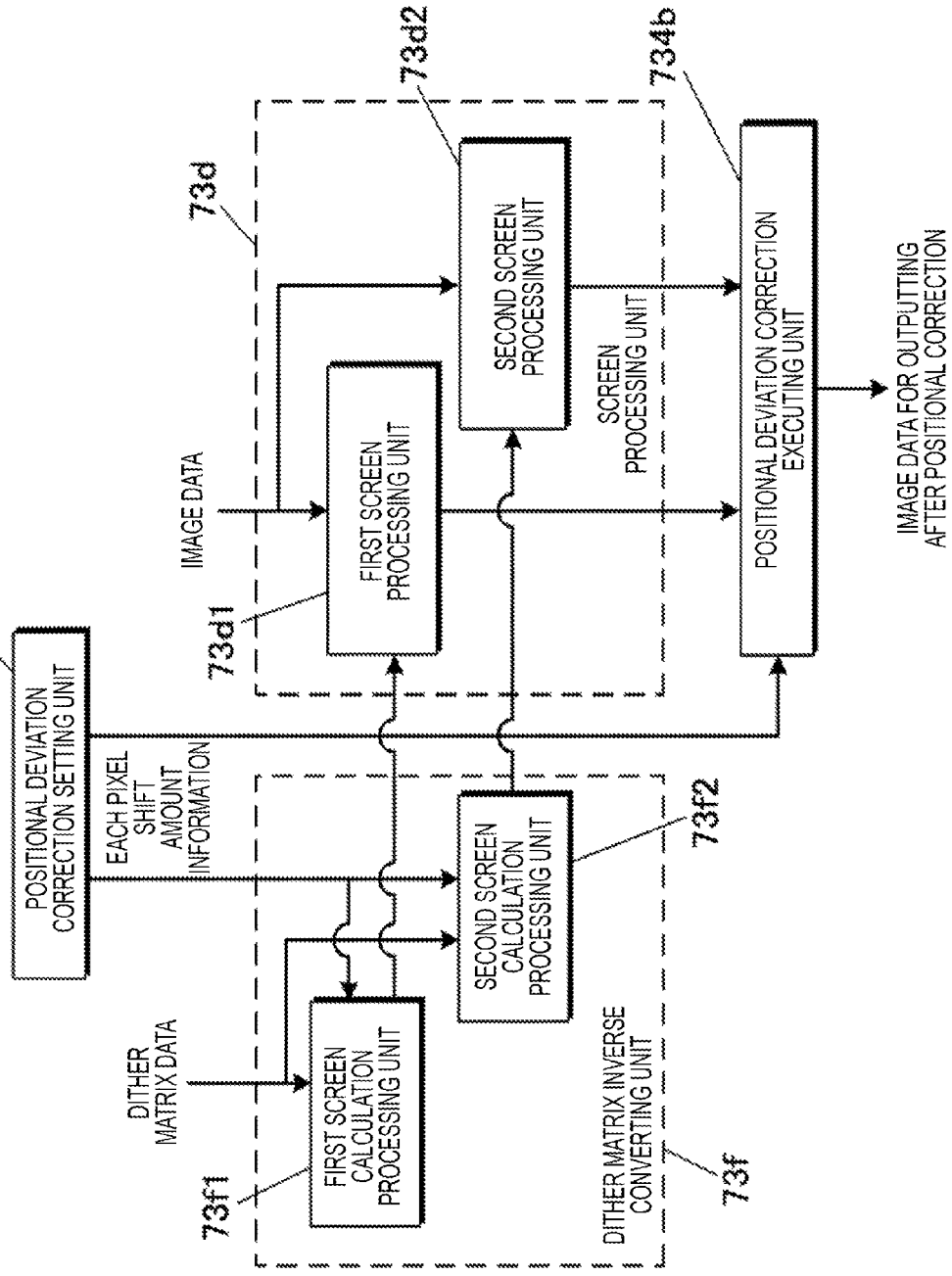
FIG. 9 is a block diagram illustrating a variation of a functional configuration related to a screen process and a positional deviation correcting process.

FIG. 9 is a block diagram illustrating a functional configuration related to the screen process and the positional deviation correcting process in this variation in detail.

The dither matrix inverse converting unit 73f includes a first screen calculation processing unit 73f1 and a second screen calculation processing unit 73f2. In the first screen calculation processing unit 73f1, a dither matrix for first screen obtained by performing the inverse converting process based on original dither matrix data and data of a shift amount in each pixel of image data set by the positional deviation correction setting unit 73c1 is calculated.

In the inverse converting process, when the shift amount in a sub scanning direction in a pixel position of original image data corresponding to each matrix component (m, n) of the dither matrix is set to s, the (m, n) component of the dither matrix for first screen inversely converted is a (m+s, n) component of the original dither matrix. That is to say, when there is a row into which the pixel is inserted, the component of the row is skipped in the dither matrix for first screen, and when there is the row from which the pixel is deleted, the component of the row is redundantly arranged twice in the dither matrix for first screen. In this embodiment, there is one pixel inserted or deleted for each row of the dither matrix, so that the shift amount s is 0, 1, or −1.

FIGS. 10A and 10B are views illustrating an example of a row number and a column number indicating each component of the original dither matrix and an example of the shift amount in each pixel position. FIG. 11A illustrates each component of the dither matrix for first screen calculated based on the values.

Herein, a case in which the M×N dither matrix is set as illustrated in FIG. 10A, and there is the inserted pixel in the middle as illustrated in FIG. 10B is described. As illustrated in FIG. 11A, for the components the row numbers of which are not larger than "5" in a first column (the column number of which is "0") in the dither matrix for first screen, the shift amount of a corresponding input image data is "0", so that the values of the row numbers "0" to "5" of the original dither matrix are assigned. In a range in which the shift amount is "1" that follows the position in which the pixel is inserted, that is to say, for the components the row numbers of which are "6" or larger with the column number "0", the row numbers from "7" of the original dither matrix are assigned. At that time, when a value of the number of rows becomes larger than "M−1", a reminder obtained by dividing the value of the number of rows by "M−1" is obtained. That is to say, each component of the "M−1"-th row of the dither matrix for first screen is the value of the 0-th row of the original dither matrix.

Next, the dither matrix for second screen is generated by the second screen calculation processing unit 73f2. The dither matrix for second screen is obtained in a manner similar to that of the dither matrix for first screen except that a value obtained by further adding or deleting one to and from the shift amount in each pixel is used.

FIG. 11B is an example of the dither matrix for second screen obtained for the dither matrix and the pixel shift amount illustrated in FIGS. 10A and 10B described above.

Herein, the example in which one is added to the shift amount is illustrated. Each component of the dither matrix for second screen is such that the value of the row number is larger by one than the component of the original dither matrix used for each component of the dither matrix for first screen. By obtaining the dither matrix for second screen in this manner, the component of the original dither matrix skipped in the dither matrix for first screen appears around the skipped position as indicated by a diagonal hatch.

The screen processing unit 73d includes a first screen processing unit 73d1 and a second screen processing unit 73d2. The first screen processing unit 73d1 performs the screen process of the input image data by using the dither matrix for first screen to generate a first output image. The second screen processing unit 73d2 performs the screen process of the input image data by using the dither matrix for second screen to generate a second output image. The first output image is the image in which the inserted pixel by the positional deviation correction is not inserted and the portion is skipped or the image in which the deleted pixel is not deleted and an adjacent pixel redundantly appears in the deleted portion.

The positional deviation correction executing unit 734b performs the positional deviation correction of the first output image based on the pixel shift amount input from the positional deviation correction setting unit 73c1. When the pixel is deleted by the positional deviation correction, the redundant pixel is deleted and the output image on which the positional deviation correction is already performed is directly generated. When the pixel is inserted by the positional deviation correction, the pixel value of the pixel other than the inserted pixel is determined by each pixel value of the first output image and the component corresponding to the insertion position in the dither matrix for second screen, that is to say, the component of the second output image on which the screen process is performed by the obliquely hatched component in FIG. 11B is set as the pixel value of the inserted pixel.

In this manner, the output processing unit 73 of this variation is provided with the screen processing unit 73d, the positional deviation correcting unit 73c includes the positional deviation correction setting unit 73c1 which sets a processing content of the deforming process based on size changing information, a determined characteristic of each pixel, and a selected type of a deforming process and the positional deviation correction executing unit 734b which executes the processing content set by the positional deviation correction setting unit 73c1 on the data of the image, the screen processing unit 73d generates an inverse dither matrix obtained by performing a process opposite to the deforming process of each pixel set by the positional deviation correction setting unit 73c1 on each element of the dither matrix and executes the screen process by using the inverse dither matrix on the data of the image, and the positional deviation correction executing unit 734b performs the deforming process set for the data of the image on which the screen process by the screen processing unit 73d is already performed. Therefore, even when the screen process is performed first, this does not affect the positional deviation correction, so that the deterioration of the image by the positional deviation correction may be avoided.

Meanwhile, the present invention is not limited to the above-described embodiment and may be variously modified. For example, although the characteristic is determined by reading the peripheral area data of each pixel of interest and the attribute data except in a case in which there is no attribute data because of the reading by the scanner 6 in the above-described embodiment, when the characteristic may be determined only by the attribute data, it is not required to read the peripheral area data before the process by the characteristic determining unit 732.

It is not limited to the characteristic classification in the above-described embodiment. For example, although it is described for the character or the graph in a single color in the above-described embodiment, it is also possible to classify according to the characteristic in consideration of the character color when the characters in a plurality of colors are mixed.

Although only the selection instruction from the four types of deforming processes by the operation unit 3 is described in the above-described embodiment, finer selection related to the selection of the deforming process may be performed at the same time. That is to say, it is also possible to select the setting of the dispersed positions in a case in which the dispersed neighborhood pixel moving process or the dispersed neighborhood pixel averaging process is selected by the selection instruction similarly.

Although the blocks are divided such that one pixel is inserted or deleted for one block according to the number of pixels to be inserted or deleted in the above-described embodiment, the similar process may be performed also when a plurality of pixels is inserted or deleted.

Although the scaling in the main scanning direction is separately performed after the scaling in the sub scanning direction is performed in the above-described embodiment, it is also possible to perform the scaling in two-dimensional directions at one time.

Although the dither matrix for second screen is obtained together with the dither matrix for first screen being the inverse dither matrix to determine the pixel value of the inserted pixel in the above-described second variation, it is also possible that not an entire dither matrix for second screen is obtained but only a portion corresponding to the inserted pixel is calculated in one-dimensional sequence. Alternatively, it is also possible to simply copy the peripheral pixel of the inserted pixel or to obtain the weighted average of the peripheral pixels when the image data on which the screen process is performed by using not the dither matrix for second screen but the dither matrix for first screen is enlarged.

The character edge correcting process described in the above-described embodiment is not an inevitable process and this may be omitted. The order of the color converting process is not limited to that described in the above-described embodiment and may be appropriately set. The order of the screen process may be appropriately changed with another process within a range in which the image on which the process is performed is not deteriorated.

Although the print controller 7 is provided inside the image forming device G to perform the process in the above-described embodiment, it is also possible to execute the process related to the positional deviation correction alone by another computer and the like.

Although the HDD is described as an example of a computer readable medium of the output processing program related to the process operation of the output processing unit 73 according to the present invention in the description above, this is not limited. A portable recording medium such as a flash memory and other non-volatile memory, SSD (solid state drive), a CD-ROM may be applied to another computer readable medium. A carrier wave may also be applied to the present invention as a medium which provides data of the program according to the present invention through a communication line. In addition, specific contents such as the configuration, control procedure, control content described in the above-described embodiment may be appropriately changed without departing from the gist of the present invention.

According to an embodiment of the present invention, there is an effect that the image data in which the positional deviation is corrected while inhibiting the deterioration in the line element may be output.

Although the present invention has been described and illustrated in detail, it is clearly understood that the same is by way of illustrated and example only and is not to be taken by way of limitation, the scope of the present invention being interpreted by terms of the appended claims.

What is claimed is:

1. An image processing device comprising:
an image correcting unit configured to correct a size of an image by inserting or deleting a predetermined number of pixels into and from the image based on size changing information of the image in which a plurality of pixel data is arranged, wherein
the image correcting unit includes:
a reading unit configured to read at least any one of attribute data corresponding to pixel of interest data in the image and the pixel data in a predetermined peripheral range including the pixel of interest;
a characteristic determining unit configured to determine a characteristic of the pixel of interest in the image from the data read by the reading unit;
a deforming process selecting unit configured to select a type of a deforming process related to determination of a position in which the predetermined number of pixels are inserted or deleted and determination of a pixel value of a pixel in a predetermined range from the inserted or deleted pixel based on a determination result of the characteristic determining unit from a plurality of types set in advance; and
a correction executing unit configured to execute the deforming process selected by the deforming process selecting unit.

2. The image processing device according to claim 1, wherein
the attribute data includes at least one of area information to classify a plurality of areas including an image area, a graph area, and a character area in the image and information related to an edge portion of a graph and a character, and
the characteristic determining unit determines a direction in which a line extends and a line width or a fine portion having a fine structure in the graph area and the character area based on continuity of the information related to the edge portion in the pixels in a predetermined adjacent range including the pixel of interest.

3. The image processing device according to claim 1, wherein
the characteristic determining unit performs area determination to classify into any one of a plurality of areas including an image area, a graph area, and a character area and determines a direction in which a line extends and a line width or a fine portion having a fine structure in the determined graph area and character area based on presence of continuity of pixel values of the pixels in a predetermined adjacent range including the pixel of interest of the image and an arranging direction and a width of the pixels having the continuity by using data of the image on which a screen process is not yet performed when the read data is the pixel data.

4. The image processing device according to claim 1, wherein
the deforming process selecting unit selects any one of:
a neighborhood pixel moving process to copy the pixel value of any one of adjacent pixels to insert or to delete the pixel data in each position on a predetermined line perpendicular to a deforming direction;
a neighborhood pixel averaging process to insert a predetermined weighted average value of pixel values of a plurality of adjacent pixels in each position on the predetermined line perpendicular to the deforming direction or to delete the pixel being a deletion target in the predetermined position and change the pixel values of a plurality of pixels adjacent to the pixel being the deletion target to predetermined weighted average values including the pixel being the deletion target;
a dispersed neighborhood pixel moving process to copy any one of the adjacent pixel values to insert or to delete the pixel data in each of positions different for each pixel column in which a plurality of pixels is arranged in the deforming direction; and
a dispersed neighborhood pixel averaging process to insert the predetermined weighted average value of the pixel values of the adjacent pixels in each of the positions different for each pixel column in which a plurality of pixels is arranged in the deforming direction to distribute an effect of the insertion to predetermined peripheral pixels of the inserted pixel or to delete the pixel data and distribute an effect of the deletion to predetermined peripheral pixels of the deleted pixel.

5. The image processing device according to claim 4, comprising:
a dispersed position table outputting unit capable of outputting a dispersed position determining table determining an insertion position or a deletion position of the pixel data in each of the pixel columns in which a plurality of pixels is arranged in the deforming direction based on a plurality of different methods when the deforming process selecting unit selects the dispersed neighborhood pixel moving process or the dispersed neighborhood pixel averaging process, wherein, the deforming process selecting unit selects one dispersed position determining table to be output from the dispersed position table outputting unit according to the characteristic determined by the characteristic determining unit when selecting the dispersed neighborhood pixel moving process or the dispersed neighborhood pixel averaging process.

6. The image processing device according to claim 1, comprising:

an operation unit configured to receive an operation by a user, wherein the deforming process selecting unit selects the deforming process related to a selection instruction when an input related to the selection instruction of the deforming process is performed to the operation unit.

7. The image processing device according to claim 1, wherein the correction executing unit separately performs deforming processes in two directions orthogonal to each other in order, and the deforming process selecting unit selects the deforming process related to deformation in one direction and selects the deforming process related to the deformation in the other direction based on a common characteristic initially determined by the characteristic determining unit.

8. The image processing device according to claim 1, comprising:

a screen process executing unit configured to perform a screen process by using a predetermined threshold matrix on data of the image, wherein the correction executing unit includes a correction content setting unit configured to set a process content of the deforming process based on the size changing information, the determined characteristic of each pixel, and the selected type of the deforming process, and a correction content executing unit configured to execute the process content set by the correction content setting unit on the data of the image, the screen process executing unit generates an inverse process matrix obtained by performing a process opposite to the deforming process of each pixel set by the correction content setting unit on each element of the threshold matrix and executes the screen process by using the inverse process matrix on the data of the image, and the correction content executing unit performs the deforming process on the data of the image on which the screen process by the screen process executing unit is already performed.

9. The image processing device according to claim 1, comprising:

a character edge correcting unit configured to perform predetermined correction on the pixel value in the vicinity of an edge portion of a character based on information related to the edge portion of the character, wherein the image correcting unit performs the deforming process on data of the image which is already corrected by the character edge correcting unit.

10. The image processing device according to claim 1, comprising:

a character edge correcting unit configured to perform predetermined correction on the pixel value in the vicinity of an edge portion of a character based on information related to the edge portion of the character, wherein the image correcting unit performs the deforming process on data of the image before the correction by the character edge correcting unit is performed, and the character edge correcting unit uses information related to deformation of the edge portion of the character by the deforming process in the correction.

11. A non-transitory recording medium storing a computer readable program for causing a computer to serve as an image correcting unit configured to correct a size of an image by inserting or deleting a predetermined number of pixels into and from the image based on size changing information of the image in which a plurality of pixel data is arranged, wherein the image correcting unit includes:

a reading unit configured to read at least any one of attribute data corresponding to pixel of interest data in the image and the pixel data in a predetermined peripheral range including the pixel of interest;

a characteristic determining unit configured to determine a characteristic of the pixel of interest in the image from the data read by the reading unit;

a deforming process selecting unit configured to select a type of a deforming process related to determination of a position in which the predetermined number of pixels are inserted or deleted and determination of a pixel value of a pixel in a predetermined range from the inserted or deleted pixel based on a determination result of the characteristic determining unit from a plurality of types set in advance; and a correction executing unit configured to execute the deforming process selected by the deforming process selecting unit.

12. The non-transitory recording medium storing a computer readable program according to claim 11, wherein the attribute data includes at least one of area information to classify a plurality of areas including an image area, a graph area, and a character area in the image and information related to an edge portion of a graph and a character, and the characteristic determining unit determines a direction in which a line extends and a line width or a fine portion having a fine structure in the graph area and the character area based on continuity of the information related to the edge portion in the pixels in a predetermined adjacent range including the pixel of interest.

13. The non-transitory recording medium storing a computer readable program according to claim 11, wherein the characteristic determining unit performs area determination to classify into any one of a plurality of areas including an image area, a graph area, and a character area and determines a direction in which a line extends and a line width or a fine portion having a fine structure in the determined graph area and character area based on presence of continuity of pixel values of the pixels in a predetermined adjacent range including the pixel of interest of the image and an arranging direction and a width of the pixels having the continuity by using data of the image on which a screen process is not yet performed when the read data is the pixel data.

14. The non-transitory recording medium storing a computer readable program according to claim 11, wherein the deforming process selecting unit selects any one of:

a neighborhood pixel moving process to copy the pixel value of any one of adjacent pixels to insert or to delete the pixel data in each position on a predetermined line perpendicular to a deforming direction;

a neighborhood pixel averaging process to insert a predetermined weighted average value of pixel values of a plurality of adjacent pixels in each position on the predetermined line perpendicular to the deforming direction or to delete the pixel being a deletion target in the predetermined position and change the pixel values of a plurality of pixels adjacent to the pixel being the deletion target to predetermined weighted average values including the pixel being the deletion target;

a dispersed neighborhood pixel moving process to copy any one of the adjacent pixel values to insert or to delete the pixel data in each of positions different for each pixel column in which a plurality of pixels is arranged in the deforming direction; and a dispersed neighborhood pixel averaging process to insert the predetermined weighted average value of the pixel values of the adjacent pixels in each of the positions different for each pixel column in which a plurality of pixels is arranged in the deforming direction to distribute an effect of the insertion to predetermined peripheral pixels of the inserted pixel or to delete the pixel data and distribute an effect of the deletion to predetermined peripheral pixels of the deleted pixel.

15. The non-transitory recording medium storing a computer readable program according to claim 14, comprising:

a dispersed position table outputting unit capable of outputting a dispersed position determining table determining an insertion position or a deletion position of the pixel data in each of the pixel columns in which a plurality of pixels is arranged in the deforming direction based on a plurality of different methods when the deforming process selecting unit selects the dispersed neighborhood pixel moving process or the dispersed neighborhood pixel averaging process, wherein the deforming process selecting unit selects one dispersed position determining table to be output from the dispersed position table outputting unit according to the characteristic determined by the characteristic determining unit when selecting the dispersed neighborhood pixel moving process or the dispersed neighborhood pixel averaging process.

16. The non-transitory recording medium storing a computer readable program according to claim 11, wherein the computer is capable of receiving an operation by a user through an operation unit, and the deforming process selecting unit selects the deforming process related to a selection instruction when an input related to the selection instruction of the deforming process is performed to the operation unit.

17. The non-transitory recording medium storing a computer readable program according to claim 11, wherein the correction executing unit separately performs deforming processes in two directions orthogonal to each other in order, and the deforming process selecting unit selects the deforming process related to deformation in one direction and selects the deforming process related to the deformation in the other direction based on a common characteristic initially determined by the characteristic determining unit.

18. The non-transitory recording medium storing a computer readable program according to claim 11, the program for causing the computer to further serve as a screen process executing unit configured to perform a screen process by using a predetermined threshold matrix on data of the image, wherein the correction executing unit includes a correction content setting unit configured to set a process content of the deforming process based on the size changing information, the determined characteristic of each pixel, and the selected type of the deforming process, and a correction content executing unit configured to execute the process content set by the correction content setting unit on the data of the image, the screen process executing unit generates an inverse process matrix obtained by performing a process opposite to the deforming process of each pixel set by the correction content setting unit on each element of the threshold matrix and executes the screen process by using the inverse process matrix on the data of the image, and the correction content executing unit performs the deforming process on the data of the image on which the screen process by the screen process executing unit is already performed.

19. The non-transitory recording medium storing a computer readable program according to claim 11, the program for causing the computer to further serve as a character edge correcting unit configured to perform predetermined correction on the pixel value in the vicinity of an edge portion of a character based on information related to the edge portion of the character, wherein the image correcting unit performs the deforming process on data of the image which is already corrected by the character edge correcting unit.

20. The non-transitory recording medium storing a computer readable program according to claim 11, the program for causing a computer to further serve as a character edge correcting unit configured to perform predetermined correction on the pixel value in the vicinity of an edge portion of a character based on information related to the edge portion of the character, wherein the image correcting unit performs the deforming process on data of the image before the correction by the character edge correcting unit is performed, and the character edge correcting unit uses information related to deformation of the edge portion of the character by the deforming process in the correction.

21. An image correcting method configured to correct a size of an image by inserting or deleting a predetermined number of pixels into and from the image based on size changing information of the image in which a plurality of pixel data is arranged comprising:

a reading step of reading at least any one of attribute data corresponding to pixel of interest data in the image and pixel data in a predetermined peripheral range including the pixel of interest;

a character determining step of determining a characteristic of the pixel of interest in the image from the data read by the step of reading;

a deforming process selecting step of selecting a type of a deforming process related to determination of a position in which the predetermined number of pixels are inserted or deleted and determination of a pixel value of a pixel in a predetermined range from the inserted or deleted pixel based on a determination result in the step of determining a characteristic from a plurality of types set in advance; and a correction executing step of executing the deforming process selected at the deforming process selecting step.

* * * * *